US012544933B2

(12) United States Patent
Ben Dov

(10) Patent No.: US 12,544,933 B2
(45) Date of Patent: Feb. 10, 2026

(54) TECHNIQUES, MACHINE LEARNING, AND MECHANISMS FOR ENABLING SUPPLY OF ENERGY TO DEVICES

(71) Applicant: Ruby.AI Robotic Technologies Ltd., Tel Aviv (IL)

(72) Inventor: Daniel Ben Dov, Tel Aviv (IL)

(73) Assignee: Ruby.AI Robotic Technologies Ltd., Tel Aviv (IL)

( * ) Notice: Subject to any disclaimer, the term of this patent is extended or adjusted under 35 U.S.C. 154(b) by 0 days.

(21) Appl. No.: 18/888,702

(22) Filed: Sep. 18, 2024

(65) Prior Publication Data

US 2026/0027723 A1 Jan. 29, 2026

Related U.S. Application Data

(60) Provisional application No. 63/674,949, filed on Jul. 24, 2024.

(51) Int. Cl.
*B25J 9/16* (2006.01)
*B67D 7/04* (2010.01)
(Continued)

(52) U.S. Cl.
CPC .......... *B25J 9/1697* (2013.01); *B67D 7/0401* (2013.01); *G06T 7/70* (2017.01); *G06V 10/12* (2022.01);
(Continued)

(58) Field of Classification Search
CPC ................. B25J 9/1697; B67D 7/0401; B67D 2007/0417; B67D 2007/0474; G06T 7/70;
(Continued)

(56) References Cited

U.S. PATENT DOCUMENTS

| 6,237,647 B1 * | 5/2001 | Pong | B67D 7/348 |
| | | | 141/94 |
| 11,648,843 B2 * | 5/2023 | Graham | B64D 39/02 |
| | | | 700/259 |

(Continued)

FOREIGN PATENT DOCUMENTS

| CN | 107150994 A | 9/2017 |
| CN | 113880033 A | 1/2022 |

(Continued)

OTHER PUBLICATIONS

PCT International Search Report and Written Opinion issued in PCT International Application No. PCT/IB2025/057462, dated Oct. 27, 2025 (15 pages).

*Primary Examiner* — Harry Y Oh
(74) *Attorney, Agent, or Firm* — Finnegan, Henderson, Farabow, Garrett & Dunner, LLP

(57) ABSTRACT

Disclosed embodiments relate to systems and methods for automatically enabling supply of energy to a machine using a movable member comprising a camera and an energy supply mechanism. Techniques include positioning the movable member to a first orientation angle to capture image data using the camera; accessing a trained machine learning model associated with the machine; identifying, based on the trained machine learning model and the captured image data, an energy input location of the machine; positioning the movable member to a second orientation angle different from the first orientation angle; moving the energy supply mechanism into a position according to the energy input location; and enabling supply of energy via the energy supply mechanism to the machine at the energy input location.

17 Claims, 18 Drawing Sheets

(51) Int. Cl.
  *G06T 7/70*   (2017.01)
  *G06V 10/12*  (2022.01)
  *G06V 10/764* (2022.01)
  *G06V 10/774* (2022.01)
  *G06V 10/82*  (2022.01)
  *G06V 20/50*  (2022.01)

(52) U.S. Cl.
  CPC ...... *G06V 20/50* (2022.01); *B67D 2007/0417* (2013.01); *B67D 2007/0474* (2013.01); *G06T 2207/10028* (2013.01); *G06T 2207/20081* (2013.01); *G06T 2207/20084* (2013.01); *G06V 10/764* (2022.01); *G06V 10/774* (2022.01); *G06V 10/82* (2022.01)

(58) Field of Classification Search
  CPC . G06T 2207/10028; G06T 2207/20081; G06T 2207/20084; G06V 10/12; G06V 20/50; G06V 10/764; G06V 10/774; G06V 10/82
  See application file for complete search history.

(56) References Cited

U.S. PATENT DOCUMENTS

| | | | |
|---|---|---|---|
| 2019/0340782 A1* | 11/2019 | Sinha | G06T 7/13 |
| 2022/0355495 A1* | 11/2022 | Rembisz | G01C 21/206 |
| 2022/0383543 A1* | 12/2022 | Hetrich | G06T 7/593 |
| 2023/0011503 A1* | 1/2023 | Duke | G06F 16/55 |
| 2024/0198535 A1* | 6/2024 | Londenberg | G06V 10/462 |

FOREIGN PATENT DOCUMENTS

| | | |
|---|---|---|
| CN | 114195084 A | 3/2022 |
| CN | 114436199 A | 5/2022 |
| CN | 116080446 A | 5/2023 |
| CN | 118056776 A | 5/2024 |
| WO | WO 2024/145984 A1 | 7/2024 |

* cited by examiner 1200A
1200B
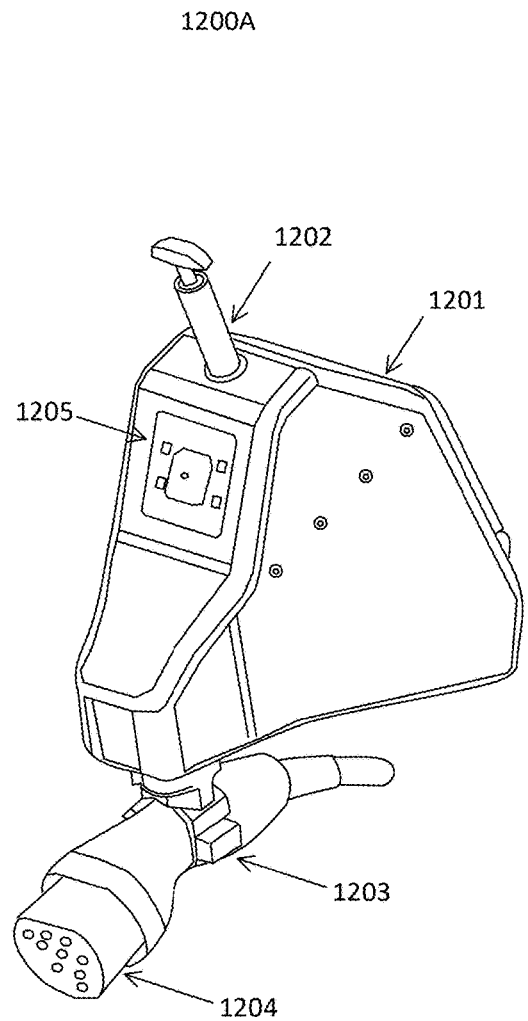
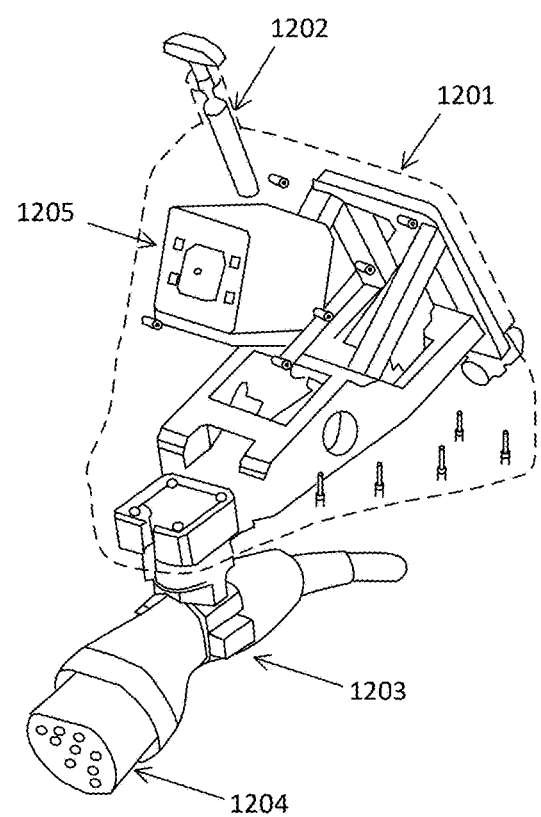
FIG. 12A
FIG. 12B

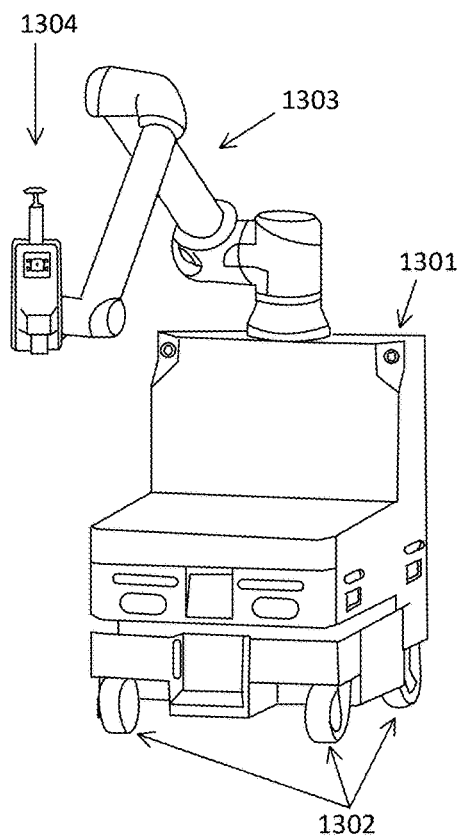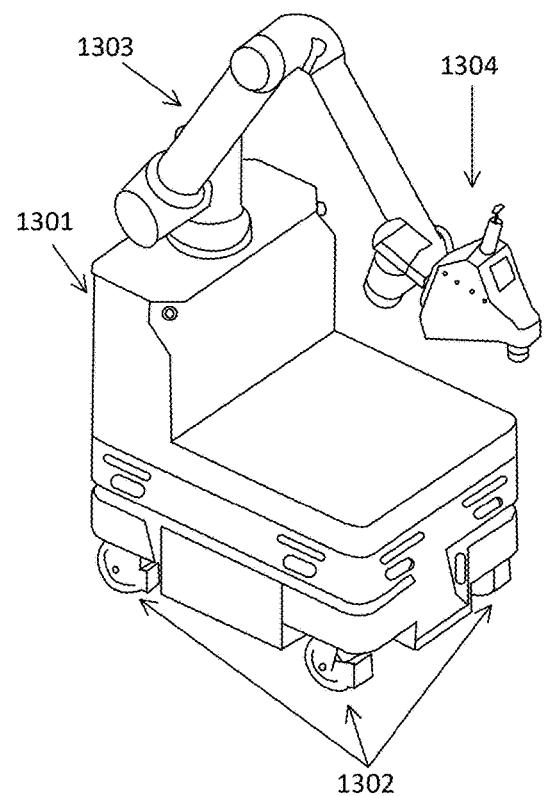
FIG. 13A    FIG. 13B

TECHNIQUES, MACHINE LEARNING, AND MECHANISMS FOR ENABLING SUPPLY OF ENERGY TO DEVICES

CROSS REFERENCE TO RELATED APPLICATION

This application claims the benefit of priority of U.S. Provisional Application No. 63/674,949, filed Jul. 24, 2024, which is incorporated herein by reference in its entirety.

BACKGROUND

Technical Field

This disclosure relates to systems and methods for supplying energy (e.g., gasoline, diesel, biodiesel, propane, electricity, natural gas, ethanol, methane, hydrogen, etc.) to devices (e.g., vehicles, robots, drones, appliances, equipment, machinery, etc.). Further, this disclosure also relates to mechanical and/or electrical devices that may be used to move, adjust, grip, or manipulate devices. In addition, this disclosure relates to machine learning or artificial intelligence techniques to support such embodiments.

Background Information

Supplying energy to devices gives rise to various technical and real-world problems. In some situations, high degrees of heat or cold, high winds, storms, etc., may make fueling or electrifying a device problematic. These types of challenging conditions may pose problems for human health and safety, as well as for the functionality and operability of fueling or electrification equipment. Further, such fueling or electrifying is subject to human error, wasted energy, harm to the environment, and potential danger to people and property. Further, in some situations it may be difficult to operate devices in hazardous environments (e.g., those where explosive or flammable devices, substances, gases, or liquids are present). In such environments, it may be difficult to operate electrical devices, lest they cause an explosion, fire, or other danger.

The below techniques provide technical solutions to these and other problems. As discussed below, techniques are disclosed to enable providing energy to devices automatically, efficiently, and accurately. In some embodiments, unique mechanisms are described to enable such techniques, which offer advantages in terms of functionality, usability, safety, and efficiency. As further discussed below, solutions are described that utilize machine learning and artificial intelligence techniques to enable the technical advancements described herein.

SUMMARY

The disclosed embodiments describe apparatuses, non-transitory computer readable media, systems, and methods for a multifunction gripper device for enabling supply of energy to a machine. For example, in an embodiment, a multifunction gripper device for enabling supply of energy to a machine may comprise a first surface comprising a camera; a second surface comprising a cap engagement mechanism configured to engage with a cap of the machine; and a third surface comprising a nozzle engagement mechanism configured to engage with a nozzle of an energy supply.

According to a disclosed embodiment, at least two of the first surface, second surface, and third surface have the same orientation plane.

According to a disclosed embodiment, each of the first surface, second surface, and third surface have a different orientation plane.

According to a disclosed embodiment, an orientation plane of the first surface is at least one of: (i) ninety degrees or (ii) approximately ninety degrees different from an orientation plane of at least one of the second surface or the third surface.

According to a disclosed embodiment, the camera is laser-based.

According to a disclosed embodiment, the cap engagement mechanism has a rotating head.

According to a disclosed embodiment, the rotating head is driven by a motor.

According to a disclosed embodiment, the rotating head is configured to open the cap of the machine.

According to a disclosed embodiment, the cap engagement mechanism is configured to close the cap of the machine.

According to a disclosed embodiment, the nozzle engagement mechanism is configured to grip the nozzle of the energy supply.

According to a disclosed embodiment, the nozzle engagement mechanism is pneumatically operated.

According to a disclosed embodiment, the pneumatic operation is configured to squeeze a trigger portion of the nozzle of the energy supply.

According to a disclosed embodiment, the multifunction gripper device is connected to a robotic arm.

According to a disclosed embodiment, the multifunction gripper device facilitates fueling the machine.

According to a disclosed embodiment, the multifunction gripper device facilitates electrically charging the machine.

According to a disclosed embodiment, the nozzle engagement mechanism is formed from a three-dimensional printing process.

According to a disclosed embodiment, the nozzle engagement mechanism is flexible.

According to a disclosed embodiment, the cap engagement mechanism and the nozzle engagement mechanism are a common mechanism.

According to a disclosed embodiment, the fluid is a pressurized gas.

The disclosed embodiments also describe apparatuses, non-transitory computer readable media, systems, and methods for a gripper device for enabling supply of energy to a machine. For example, in an embodiment, a gripper device for enabling supply of energy to a machine may comprise an engagement mechanism configured to engage with at least one of the machine or an energy supply; and a camera configured to capture image data, the image data comprising: image data of the machine, and image data of an energy input of the machine.

According to a disclosed embodiment, the gripper device may further comprise a data communications interface to provide the captured image data to an analysis system.

According to a disclosed embodiment, the analysis system is configured to determine a type of the machine based on the image data of the machine.

According to a disclosed embodiment, the analysis system is configured to determine energy input location coordinates based on the image data of the energy input of the machine.

According to a disclosed embodiment, the analysis system is configured to control a robotic arm to which the gripper device is attached.

According to a disclosed embodiment, the analysis system is configured to control the engagement mechanism.

According to a disclosed embodiment, the engagement mechanism and the camera are located on different orientation planes of the gripper device.

According to a disclosed embodiment, the engagement mechanism and the camera have different orientation planes that differ by at least one of: (i) ninety degrees or (ii) approximately ninety degrees.

According to a disclosed embodiment, the engagement mechanism and the camera have different orientation planes that differ by at least one of: (i) one-hundred and eighty degrees or (ii) approximately one-hundred and eighty degrees.

According to a disclosed embodiment, the camera is at least one of: a 3-D camera, laser-based, or time-of-flight based.

According to a disclosed embodiment, the engagement mechanism comprises a plurality of fingers for gripping an energy supply nozzle.

According to a disclosed embodiment, the engagement mechanism is configured to grip an energy supply nozzle in at least two places.

According to a disclosed embodiment, the engagement mechanism is configured to open a cap at the energy input location on the machine.

According to a disclosed embodiment, the cap is at least one of: a lid, a cover, a plug, or a film.

According to a disclosed embodiment, the opening comprises at least one of a rotating operation or a pushing operation by the engagement mechanism.

According to a disclosed embodiment, the engagement mechanism is configured to close a cap at the energy input location on the machine.

According to a disclosed embodiment, the closing comprises at least one of a rotating operation or a pushing operation by the engagement mechanism.

The disclosed embodiments also describe apparatuses, non-transitory computer readable media, systems, and methods for a multifunction gripper device for enabling supply of energy to a machine. For example, in an embodiment, a multifunction gripper device for enabling supply of energy to a machine may comprise a first surface of a chamber comprising a camera; a second surface of the chamber comprising a cap engagement mechanism configured to engage with a cap of the machine; and a third surface of the chamber comprising a nozzle engagement mechanism configured to engage with a nozzle of an energy supply; wherein the chamber: houses an electronic controller configured to control at least one of the camera, the cap engagement mechanism, or the nozzle engagement mechanism, and is pressurized to have a higher air pressure than an air pressure surrounding the chamber.

According to a disclosed embodiment, the chamber comprises an air intake conduit to achieve the pressurization.

According to a disclosed embodiment, the chamber comprises a compressor to achieve the pressurization.

According to a disclosed embodiment, the chamber is sealed to maintain the pressurization.

According to a disclosed embodiment, the chamber is configured to prevent flammable gas from outside the chamber from entering the chamber.

According to a disclosed embodiment, at least two of the first surface, second surface, and third surface have the same orientation plane.

According to a disclosed embodiment, each of the first surface, second surface, and third surface have a different orientation plane.

According to a disclosed embodiment, an orientation plane of the first surface is ninety degrees different from an orientation plane of at least one of the second surface or the third surface.

According to a disclosed embodiment, the cap is a lid.

According to a disclosed embodiment, the cap is a cover.

According to a disclosed embodiment, the cap is a plug.

According to a disclosed embodiment, the chamber is cooled with respect to an ambient temperature.

According to a disclosed embodiment, the chamber is heated with respect to an ambient temperature.

The disclosed embodiments also describe apparatuses, non-transitory computer readable media, systems, and methods for a multiuse and multifunction gripper device. For example, in an embodiment, a multiuse and multifunction gripper device may comprise a first surface of a chamber comprising a camera; and a second surface of the chamber comprising an engagement mechanism configured to engage with an object; wherein the chamber: houses an electronic controller configured to control at least one of the camera or the engagement mechanism, and is pressurized to have a higher air pressure than an air pressure surrounding the chamber.

According to a disclosed embodiment, the gripper device may further comprise a plurality of cameras.

According to a disclosed embodiment, the plurality of cameras operate according to at least two different spectral frequencies.

According to a disclosed embodiment, the different spectral frequencies include at least a laser frequency and a video frequency.

According to a disclosed embodiment, the engagement mechanism includes robotically controlled fingers.

According to a disclosed embodiment, the engagement mechanism includes a robotically controlled hand.

According to a disclosed embodiment, the engagement mechanism includes a controllable magnet.

According to a disclosed embodiment, the engagement mechanism is configured to push the object.

According to a disclosed embodiment, the engagement mechanism is configured to pull the object.

According to a disclosed embodiment, the engagement mechanism is configured to clean the object.

According to a disclosed embodiment, the engagement mechanism is configured to turn the object.

According to a disclosed embodiment, the engagement mechanism is configured to move the object.

According to a disclosed embodiment, the engagement mechanism is configured to hold the object.

According to a disclosed embodiment, the engagement mechanism is configured to open the object.

According to a disclosed embodiment, the engagement mechanism is configured to break the object.

According to a disclosed embodiment, the engagement mechanism includes a camera.

According to a disclosed embodiment, the camera of the engagement mechanism is configured to capture images from inside the object.

The disclosed embodiments also describe apparatuses, non-transitory computer readable media, systems, and methods for automatically supplying energy to a machine through machine learning and machine vision techniques. For example, in an embodiment, a computer-implemented method for automatically supplying energy to a machine through machine learning and machine vision techniques may comprise identifying, based on first image data from one or more cameras, a presence of the machine; accessing a trained machine learning model associated with the machine; identifying, based on the trained machine learning model and second image data from the one or more cameras, an energy input of the machine; moving an energy supply mechanism into a position for supplying energy using the energy input; and enabling supply of energy via the energy supply mechanism to the machine using the energy input.

According to a disclosed embodiment, the method may further comprise identifying a type of the machine and providing the type to the trained machine learning model.

According to a disclosed embodiment, the energy input is a cap or receptacle of the machine.

According to a disclosed embodiment, the method may further comprise determining a center of the cap or receptacle.

According to a disclosed embodiment, the energy input is stored as three-dimensional coordinates.

According to a disclosed embodiment, the energy input is stored as six-dimensional coordinates.

According to a disclosed embodiment, the method may further comprise determining an energy supply angle for supplying energy via the energy supply mechanism.

According to a disclosed embodiment, the energy supply angle is determined based on the trained machine learning model.

According to a disclosed embodiment, the method may further comprise supplying energy via the energy supply mechanism to the machine at the energy input location according to the energy supply angle.

According to a disclosed embodiment, the method may further comprise engaging the energy supply mechanism with the energy input.

According to a disclosed embodiment, the engagement is mechanical.

According to a disclosed embodiment, the engagement is magnetic.

According to a disclosed embodiment, the method may further comprise determining a completion state for supplying the energy to the machine.

According to a disclosed embodiment, the method may further comprise withdrawing the energy supply mechanism from the energy input.

According to a disclosed embodiment, the method may further comprise closing a cap of the energy input.

According to a disclosed embodiment, the method may further comprise closing a lid of the energy input.

The disclosed embodiments also describe apparatuses, non-transitory computer readable media, systems, and methods for enabling supply of energy to a machine using a movable member comprising a camera and an energy supply mechanism. For example, in an embodiment, a computer-implemented method for automatically enabling supply of energy to a machine using a movable member comprising a camera and an energy supply mechanism may comprise positioning the movable member to a first orientation angle to capture image data using the camera; accessing a trained machine learning model associated with the machine; identifying, based on the trained machine learning model and the captured image data, an energy input location of the machine; positioning the movable member to a second orientation angle different from the first orientation angle; moving the energy supply mechanism into a position according to the energy input location; and enabling supply of energy via the energy supply mechanism to the machine at the energy input location.

According to a disclosed embodiment, the movable member comprises a robotic arm.

According to a disclosed embodiment, the movable member comprises a mobile robotic system.

According to a disclosed embodiment, in the first orientation angle the energy supply mechanism does not obstruct a field of view of the camera.

According to a disclosed embodiment, the camera and the energy supply mechanism are positioned on surfaces of the movable member that differ by ninety degrees.

According to a disclosed embodiment, the camera and the energy supply mechanism are positioned on surfaces of the movable member that differ by one-hundred and eighty degrees.

According to a disclosed embodiment, positioning the movable member to the second orientation angle is based on the stored energy input location.

According to a disclosed embodiment, the positioning of the movable member occurs without requiring any image data from the camera while the movable member has the second orientation angle.

According to a disclosed embodiment, the moving the energy supply mechanism into the position occurs without requiring any image data from the camera while the movable member has the second orientation angle.

According to a disclosed embodiment, the supplying energy via the energy supply mechanism to the machine occurs without requiring any image data from the camera while the movable member has the second orientation angle.

According to a disclosed embodiment, the camera is laser-based.

According to a disclosed embodiment, the camera is time-of-flight based.

According to a disclosed embodiment, the camera captures three-dimensional image data.

According to a disclosed embodiment, the three-dimensional image data includes a point cloud.

The disclosed embodiments also describe apparatuses, non-transitory computer readable media, systems, and methods for a movable robotic device for automatically enabling supply of energy to a machine. For example, in an embodiment, a movable robotic device for automatically enabling supply of energy to a machine may comprise a body; a locomotion mechanism attached to the body, configured to enable movement of the movable robotic device in at least two dimensions; a camera attached to the body, configured to capture image data of the machine; a communications interface; and an engagement mechanism, configured to engage with at least one of: a nozzle of an energy supply or an energy input of the machine; wherein the communications interface is configured to: communicate the captured image data to a trained machine learning model; and receive, based on an output of the trained machine learning model, an instruction regarding a location associated with the energy input of the machine; and wherein the movable robotic device is configured to, based on the instruction, supply energy to the machine via the energy input using the engagement mechanism.

According to a disclosed embodiment, the locomotion mechanism comprises one or more wheel.

According to a disclosed embodiment, the locomotion mechanism comprises one or more track.

According to a disclosed embodiment, the movable robotic device further comprises a robotic arm attached to the body.

According to a disclosed embodiment, the robotic arm is pneumatically operated.

According to a disclosed embodiment, the engagement mechanism is pneumatically operated.

According to a disclosed embodiment, the mobile robotic device is configured to achieve a proximity to the machine using the locomotion mechanism.

According to a disclosed embodiment, the mobile robotic device is configured to achieve a proximity to the machine based on a combination of use of the locomotion mechanism and the robotic arm.

According to a disclosed embodiment, the engagement mechanism is configured to engage mechanically with the energy input.

According to a disclosed embodiment, the engagement mechanism is configured to engage magnetically with the energy input.

According to a disclosed embodiment, the engagement mechanism is configured to wirelessly communicate with the at least one of: the nozzle of the energy supply or the energy input of the machine.

According to a disclosed embodiment, the wirelessly communicating causes a cap of the machine to open.

According to a disclosed embodiment, the engagement mechanism is horn shaped.

The disclosed embodiments also describe apparatuses, non-transitory computer readable media, systems, and methods for efficiently and automatically enabling supply of energy to a machine. For example, in an embodiment, a computer-implemented method for efficiently and automatically enabling supply of energy to a machine may comprise capturing image data of the machine using a camera; accessing a trained machine learning model associated with the machine; identifying, based on the trained machine learning model and the captured image data, an energy input location of the machine; determining a center point of the energy input location; storing location information for the center point; opening, using a robotic member, a cap at the energy input location; without requiring any additional image data from the camera, positioning an energy supply mechanism according to the stored location information for the center point; and without requiring any additional image data from the camera, supplying energy via the energy supply mechanism to the machine at the energy input location.

According to a disclosed embodiment, the method may further comprise rotating the robotic member after capturing the image data and before opening the cap at the energy input location.

According to a disclosed embodiment, the rotating comprises rotating the robotic member to align the camera away from the machine.

According to a disclosed embodiment, the rotating comprises rotating the robotic member to align the energy supply mechanism toward the machine.

According to a disclosed embodiment, the method may further comprise confirming a successful engagement of the energy supply mechanism before supplying the energy via the energy supply mechanism to the machine.

According to a disclosed embodiment, the method may further comprise requiring a no-fault status before supplying the energy via the energy supply mechanism to the machine.

According to a disclosed embodiment, the method may further comprise determining, based on the trained machine learning model, an energy supply angle for supplying the energy via the energy supply mechanism to the machine.

According to a disclosed embodiment, the method may further comprise aligning the energy supply mechanism according to the determined energy supply angle.

According to a disclosed embodiment, the method may further comprise supplying the energy via the energy supply mechanism at the determined energy supply angle to the machine.

According to a disclosed embodiment, the method may further comprise closing, using the robotic member, the cap at the energy input location.

According to a disclosed embodiment, the closing is performed without requiring any additional image data from the camera.

The disclosed embodiments also describe apparatuses, non-transitory computer readable media, systems, and methods for a system for automatically enabling supply of energy to machines. For example, in an embodiment, a system for automatically enabling supply of energy to machines may comprise a plurality of movable robotic members, each having an associated energy supply mechanism and each having an associated camera; a plurality of locomotive mechanisms to cause the plurality of movable robotic members to move to achieve a proximity to the one or more machines; a machine learning model configured to receive image data from the associated cameras and determine energy supply locations for the one or more machines; and a controller configured to cause the plurality of energy supply mechanisms to engage with the energy supply locations for the one or more machines, and to enable supply of energy to the one or more machines via the energy supply locations.

According to a disclosed embodiment, the machine learning model is further configured to determine one or more energy supply angle for the one or more machines.

According to a disclosed embodiment, the controller is configured to cause the plurality of energy supply mechanisms to supply energy to the one or more machines via the energy supply locations according to the determined one or more energy supply angle.

According to a disclosed embodiment, the plurality of movable robotic members are configured to achieve the proximity by moving toward the one or more machines located in one or more designated machine collection areas.

According to a disclosed embodiment, the one or more designated machine collection areas are vehicle parking spots.

According to a disclosed embodiment, the one or more designated machine collection areas are vehicle storage locations.

According to a disclosed embodiment, the locomotive mechanisms include one or more moving tracks.

According to a disclosed embodiment, the locomotive mechanisms include one or more movable robotic devices.

According to a disclosed embodiment, the determined energy supply locations for the one or more machines are caps of the one or more machines.

According to a disclosed embodiment, the plurality of movable robotic members are configured to open the caps of the one or more machines.

According to a disclosed embodiment, the controller is configured to receive a notification that a particular machine will arrive at a machine collection location.

According to a disclosed embodiment, the controller is configured to prepare one of the plurality of movable robotic members for the arrival of the machine.

According to a disclosed embodiment, the preparation includes reserving an area for the machine.

According to a disclosed embodiment, the preparation includes selecting a fuel type for the machine.

According to a disclosed embodiment, the preparation includes selecting an electric charging parameter for the machine.

According to a disclosed embodiment, the preparation includes retrieving account information associated with the machine.

The disclosed embodiments also describe apparatuses, non-transitory computer readable media, systems, and methods for interactively enabling supply of energy to a machine associated with a user. For example, in an embodiment, a computer-implemented method for interactively enabling supply of energy to a machine associated with a user may comprise establishing a communications session with an application associated with a user; accessing account information associated with the application, wherein the account information identifies the machine; identifying a physical presence of the machine at an energy supply location; receiving an instruction from the user via the application; capturing via a camera image data associated with the machine at the energy supply location; providing the captured image data to a trained machine learning model; obtaining an output of the trained machine learning model; moving an energy supply mechanism into a position based on the output; and enabling supply, based on the instruction from the user, of energy via the energy supply mechanism to the machine.

According to a disclosed embodiment, the instruction from the user comprises an agreement to begin the energy supply.

According to a disclosed embodiment, the instruction from the user comprises a command to begin the energy supply.

According to a disclosed embodiment, the instruction from the user comprises a type of energy to be supplied.

According to a disclosed embodiment, the instruction from the user comprises a duration for the energy supply.

According to a disclosed embodiment, the instruction from the user comprises a cost for the energy supply.

According to a disclosed embodiment, the instruction from the user comprises a rate for the energy supply.

According to a disclosed embodiment, the instruction from the user comprises a volume for the energy supply.

According to a disclosed embodiment, the method may further comprise generating a prompt for an advertisement to be displayed to the user based on the identification of the physical presence of the machine at the energy supply location.

According to a disclosed embodiment, the method may further comprise generating a prompt for entertainment content to be displayed to the user based on the identification of the physical presence of the machine at the energy supply location.

According to a disclosed embodiment, the method may further comprise generating a prompt for purchase opportunity to be presented to the user based on the identification of the physical presence of the machine at the energy supply location.

According to a disclosed embodiment, the method may further comprise generating a prompt for social media opportunity to be presented to the user based on the identification of the physical presence of the machine at the energy supply location.

According to a disclosed embodiment, the method may further comprise receiving an override instruction from the application.

According to a disclosed embodiment, the method may further comprise preventing or halting the supplying of the energy via the energy supply mechanism based on the override instruction.

The disclosed embodiments also describe apparatuses, non-transitory computer readable media, systems, and methods for centrally updating and distributing machine learning models for automatic energy supply. For example, in an embodiment, a computer-implemented method for centrally updating and distributing machine learning models for automatic energy supply may comprise receiving, from a plurality of automatic energy supply locations, machine learning data, wherein: each of the plurality of automatic energy supply locations executes a machine learning model to identify locations on machines for supplying energy, and the received machine learning data comprises at least one of: vehicle type, energy supply location data, or energy supply image data; updating a central machine learning model based on the received machine learning data; and distributing the updated central machine learning model to one or more of the plurality of automatic energy supply locations for execution.

According to a disclosed embodiment, the vehicle type includes at least one of: vehicle make, vehicle model, or vehicle year.

According to a disclosed embodiment, the energy supply location data includes three-dimensional location coordinates of an energy supply point on a machine.

According to a disclosed embodiment, the energy supply location data includes six-dimensional location coordinates of an energy supply point on a machine.

According to a disclosed embodiment, the energy supply location data includes an energy supply angle.

According to a disclosed embodiment, the energy supply image data includes an image of a cap of a machine.

According to a disclosed embodiment, the energy supply image data is laser-based image data.

According to a disclosed embodiment, the energy supply image data is three-dimensional image data.

According to a disclosed embodiment, the energy supply image data is a point cloud.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIGS. 12A-12B illustrate an exemplary multifunction gripper device, in accordance with disclosed embodiments.

FIGS. 13A-13B illustrate an exemplary movable robotic device for automatically enabling supply of energy to a machine, in accordance with disclosed embodiments.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail.

Well-known methods, procedures, and components have not been described in detail so as not to obscure the principles of the example embodiments. Unless explicitly stated, the example methods and processes described herein are not constrained to a particular order or sequence, or constrained to a particular system configuration.

Additionally, some of the described embodiments or elements thereof can occur or be performed simultaneously, at the same point in time, or concurrently.

The techniques for supplying energy (e.g., gasoline, diesel, biodiesel, propane, electricity, natural gas, ethanol, methane, hydrogen, etc.) to devices (e.g., vehicles, robots, drones, appliances, equipment, machines, etc.) described herein overcome several technological problems relating to energy supply, efficiency, safety, and operability. As discussed above, technical problems may arise when high or low temperatures, wet conditions, snowy conditions, icy conditions, windy conditions, sandy conditions, remote locations or geographies, or other challenging conditions are present. These conditions may lead to energy supply device malfunctions, failures, and other errors. Consequently, these types of conditions may result in wastes of energy and potential hazards to humans and machines. Further, even when challenging environmental conditions are not present, energy supply may be prone to other types of malfunctions and errors, such as human error, machine error, and the like. The technological solutions described herein address these and other problems in the arts of energy supply, robotics, and artificial intelligence or machine learning. The various technical advantages of the below techniques include enhanced energy supply efficiency, safety, reliability, and accuracy.

Reference will now be made in detail to the disclosed embodiments, examples of which are illustrated in the accompanying drawings.

Figure 1:
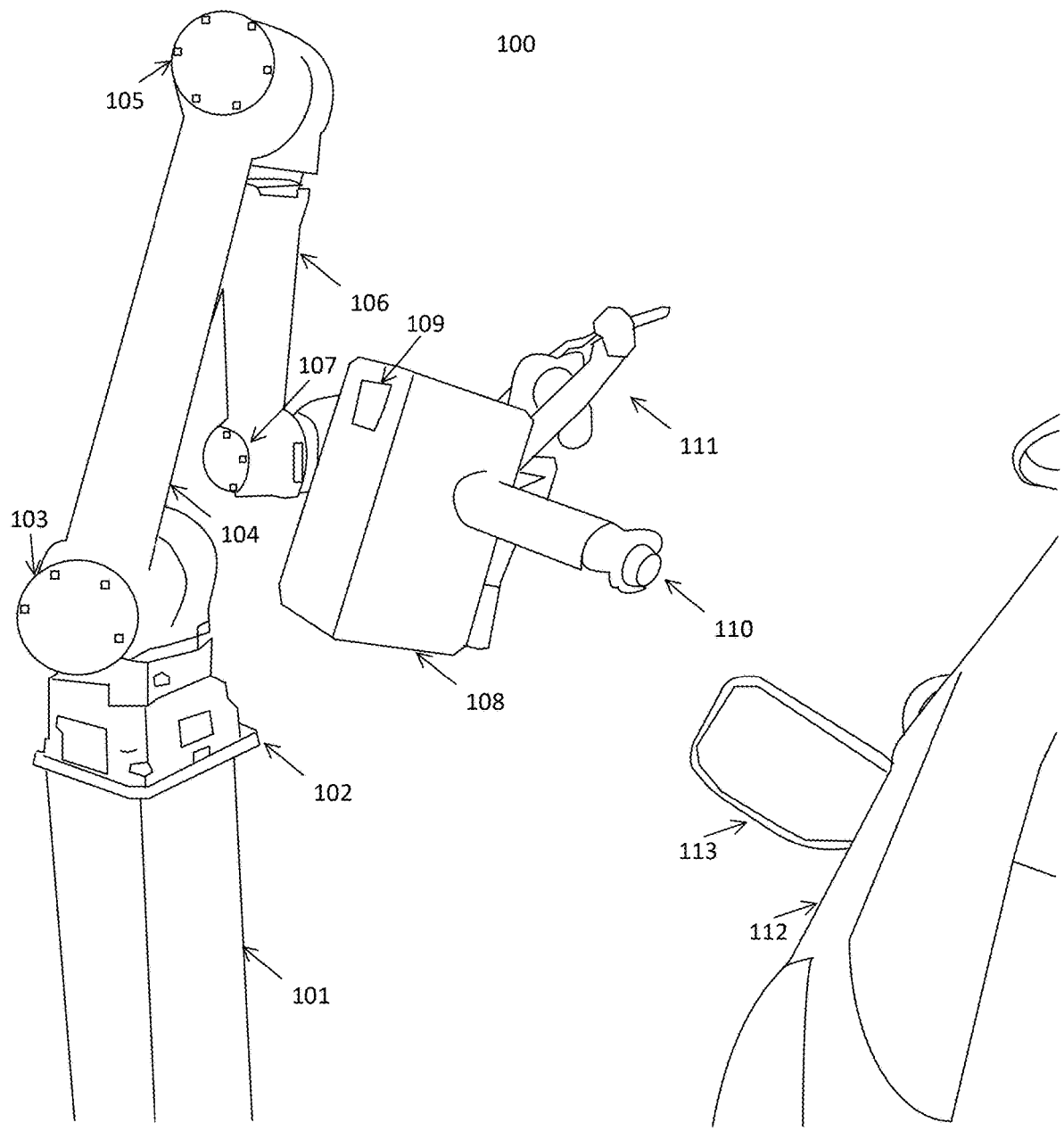
FIG. 1 illustrates an exemplary system for supplying energy to a device, in accordance with disclosed embodiments.

FIG. 1 illustrates an exemplary system 100 for supplying energy to a device, in accordance with disclosed embodiments. As discussed herein, the type of energy being supplied may take various forms. For example, the energy may be in the form of gasoline, diesel, biodiesel, propane, electricity, natural gas, ethanol, methane, hydrogen, or various others. In accordance with various disclosed embodiments, the energy may be supplied in a public station (e.g., fueling station), at a personal or private station, in an industrial setting, in a laboratory, in a school, in an office, in a remote or open setting, or various other environments.

The device receiving energy, as disclosed herein, may take many forms. For example, the device may be a transportation device such as a passenger car, bus, truck, all-terrain vehicle, snowmobile, airplane, helicopter, drone, boat, ship, train, or various others. Further, the device may be any other type of device requiring energy, such as an IoT device, machine, appliance, weapon system, or various others. These different types of devices may utilize energy, as discussed above, for their operations. The energy may be stored (e.g., in a tank, in a battery, or the like), may be used continuously as supplied, or a combination of the two.

As illustrated in FIG. 1, a gripper device may be configured to supply energy to a vehicle using a robotic mechanism. The gripper device may include a housing 108, camera 109, cap engagement mechanism 110, and nozzle engagement mechanism 111. As shown, each of the camera 109, cap engagement mechanism 110, and nozzle engagement mechanism 111 may be located on a different surface or plane of body 108. For example, camera 109 may be positioned on a surface of body 108 ninety degrees different from cap engagement mechanism 110 and one-hundred and eighty degrees different from nozzle engagement mechanism 111. Further, cap engagement mechanism 110 may be positioned on a surface of body 108 ninety degrees different from nozzle engagement mechanism 111. Of course, other arrangements of camera 109, cap engagement mechanism 110, and nozzle engagement mechanism 111 are possible too. For example, each of camera 109, cap engagement mechanism 110, and nozzle engagement mechanism 111 may be located on a same or common surface of body 108, or two of the same may be so located on a same or common surface. Further, any one of camera 109, cap engagement mechanism 110, and nozzle engagement mechanism 111 may be located on a fourth surface of body 108, or a top or bottom surface. In further embodiments, body 108 may not necessarily be six-sided as shown, but may have fewer or more sides, or may be spherical in shape. In additional embodiments, camera 109, cap engagement mechanism 110, and nozzle engagement mechanism 111 may be assembled as combined structures. For example, camera 109 may be assembled into cap engagement mechanism 110 or into nozzle engagement mechanism 111. As another example, cap engagement mechanism 110 may be assembled into nozzle engagement mechanism 111. It should be understood that the exemplary arrangement in FIG. 1 of camera 109, cap engagement mechanism 110, and nozzle engagement mechanism 111 being separated from each other by ninety degrees is one possible implementation, but various others are possible as discussed above.

According to some embodiments, one or both of cap engagement mechanism 110 and nozzle engagement mechanism 111 may be implemented as a robotic hand. For example, cap engagement mechanism 110 or nozzle engagement mechanism 111 may take the form of a human hand with movable, robotic fingers. In such embodiments, the robotic hand may be robotically controlled to perform the actions of cap engagement mechanism 110 and nozzle engagement mechanism 111 described herein, such as grasping an energy supply mechanism (e.g., handle or nozzle), opening a cap or lid, and supplying energy to a device. Alternatively, one or both of cap engagement mechanism 110 or nozzle engagement mechanism 111 may take the horn-shape of nozzle engagement mechanism 111 shown in FIG. 2 below, which may be suitable for engaging with a particular type of object (e.g., a fuel pump handle).

In some embodiments, camera 109 may be a Light Detection And Ranging (LiDAR) camera, time-of-flight (direct or indirect) camera, laser-based time-of-flight (direct or indirect) camera, three-dimensional time-of-flight (direct or indirect) camera, laser triangulation camera, structured light camera, charge-coupled device (CCD) camera, electron-multiplied CCD (EMCCD) camera, or complementary metal-oxide-semiconductor (CMOS) camera, among various others. Such cameras may capture two-dimensional or three-dimensional images, and the images may be captured as still images, point clouds, video, or data (e.g., distance or time). In embodiments using multiple cameras, individual cameras may operating according to the same or different spectral frequencies (e.g., one or more laser frequency, video frequency, etc.). Of course, as discussed above, other implementations of camera 109 are possible too. In the embodiment shown in FIG. 1, camera 109 is positioned ninety degrees apart from cap engagement mechanism 110. In this embodiment, when camera 109 is positioned to view the fueling lid 113 or cap of vehicle 112, cap engagement mechanism 110 and nozzle engagement mechanism 111 may be aligned away from the fueling lid 113 or cap of vehicle 112.

The images from camera 109 may be used to identify various objects. In particular, using machine learning or artificial intelligence techniques, images from camera 109 may be analyzed or compared to classify particular types of objects or unique individual objects. The machine learning or artificial intelligence techniques may be performed using algorithms run locally in system 100 (e.g., at a computing device within the gripper device, within the robotic mechanism, or separate from both), or remotely from system 100 (e.g., at an external, network-connected server or other computing device). Various types of objects may be identified or classified using the disclosed machine learning or artificial intelligence techniques, such as vehicles (e.g., vehicle 112), fueling lids (e.g., lid 113), fueling caps, cables, fuel (e.g., octane) types, license plates, wheels, tires, human drivers, and various others.

In accordance with the various embodiments described herein, system 100 may utilize a machine learning or artificial intelligence model, or may communicate with a separate analytical system running a machine learning or artificial intelligence model. In embodiments discussed further below, the machine learning or artificial intelligence model, whether integrated or separate, may be trained to identify various types of objects in an energy supply environment. Further, in additional embodiments discussed below, the machine learning or artificial intelligence model may allow for determinations of locations of such components, distances for moving devices (e.g., energy supply mechanisms, grippers, etc.) relative to those components, and angles of movement toward or away from those components.

The machine learning algorithms used by or with system 100 (also referred to as artificial intelligence) may be trained and employed for the purposes of analyzing images (e.g., images of nozzles, caps, doors, handles, openings, grips, etc.) captured from imaging sensors (e.g., camera 109, etc.). Such algorithms may be trained using training examples, such as described below. Some non-limiting examples of such machine learning algorithms may include classification algorithms, data regression algorithms, image segmentation algorithms, image detection algorithms, image recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth.

For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, processes, and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper-parameters, where the hyperparameters may be set manually by a person or automatically by a process external to the machine learning algorithm (such as a hyper-parameter search algorithm), and the parameters of the machine learning algorithm may be set by the machine learning algorithm according to the training examples. In some implementations, the hyper-parameters may be set according to the training examples and the validation examples, and the parameters may be set according to the training examples and the selected hyper-parameters.

In some embodiments, trained machine learning algorithms (e.g., artificial intelligence algorithms) may be used to analyze inputs and generate outputs, for example in the cases described below. In some examples, a trained machine learning algorithm may be used as an inference model that, when provided with an input (e.g., an image from camera 109, or a training image), generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image or segment thereof, and the inferred output may include a classification of an image or segment thereof, etc. In yet another example, a trained machine learning algorithm may include a regression model, the input may include an image or segment thereof, and the inferred output may include an inferred value for an item depicted in the image. In an additional example, a trained machine learning algorithm may include an image segmentation model, the input may include an image or segment thereof, and the inferred output may include a segmentation of the image. In yet another example, a trained machine learning algorithm may include an object detector, the input may include an image or segment thereof, and the inferred output may include one or more detected objects or elements in the image. In some examples, the trained machine learning algorithm may include one or more formulas and/or one or more functions and/or one or more rules and/or one or more procedures. The input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, transformer based networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, the computing device implementing the machine learning or artificial intelligence algorithms may also include signal processing or preprocessing circuitry. For example, this may enable the system to analyze image data (or other signals, as described herein) to obtain preprocessed image data, and subsequently analyze the image data and/or the preprocessed image data to obtain the desired outcome. One of ordinary skill in the art will recognize that the following are examples, and that the image data may be preprocessed using other kinds of preprocessing methods. In some examples, the image data may be preprocessed by transforming the image data using a transformation function to obtain transformed image data, and the preprocessed image data may include the transformed image data.

For example, the transformed image data may include one or more convolutions of the image data. Further, the transformation function may comprise one or more image filters. In some examples, the transformation function may include a nonlinear function. Further, the image data may be preprocessed by smoothing at least parts of the image data, for example using Gaussian convolution, using a median filter, and so forth. In other examples, the image data may be preprocessed to obtain a different representation of the image data. For example, the preprocessed image data may include: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may include information based on and/or related to the extracted edges. In some examples, the image data may be preprocessed to extract image features from the image data.

In some embodiments, analyzing image data (for example, by the methods, steps and processor function described herein) may include analyzing the image data and/or the preprocessed image data using one or more rules, functions, procedures, artificial neural networks, object detection algorithms, anatomical detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

In some embodiments, a computing device may train the machine learning or artificial intelligence model itself (e.g., locally in system 100, or externally). In other embodiments, the computing device may receive a trained version of the machine learning or artificial intelligence model, and either implement that trained version or perform further training. In further embodiments, the computing device may provide data to an external source (e.g., image data collected from camera 109) to train a machine learning or artificial intelligence model.

The training of the machine learning or artificial intelligence model may be done in several ways, consistent with the above discussion of training techniques. For example, using the types of image sensors discussed above regarding camera 109, an image may be obtained and, in some embodiments, undergo processing, before being passed on for classification by a trained machine learning algorithm. By combining the optionally processed image with environmental characteristic features (e.g., based on a unique physical or geographical environment of system 100), the machine learning algorithm may recognize objects in images more effectively. With each cycle of detection and classification the trained machine learning algorithm may improve its accuracy and performance in image or object detection.

Some embodiments of the present disclosure relate to computer-implemented methods for training a machine learning algorithm to detect components (e.g., nozzles, caps, doors, covers, films, handles, openings, grips, connectors, inputs, etc.), locations of the components, and angles of approach or retreat from the components. The disclosed techniques may comprise identification of a first dataset comprising first image data and one or more first parameters associated with the image. The parameters associated with the image may include a lighting condition, air pressure, time of day, temperature, wind, humidity, precipitation, or various other conditions associated with the image.

The first data set may be input to a machine learning algorithm, which may be configured to classify the first dataset. A non-exhaustive list of available classifications may include specific instances or general classifications of nozzles, caps, doors, handles, openings, grips, etc. Further, the classifications may include specific instances or general classifications such as an outer surface of a device, a power receptable of a device, a button or switch, a lever, an opening, a light, an exhaust, an antenna, a windshield, a license plate, a window, a mirror, a wheel, a tire, and various other physical elements of a device.

Following classification of the first dataset, a second dataset comprising second image data and one or more second parameters associated with the image may be identified. This second data set may be input to the machine learning algorithm for the algorithm to also classify the second dataset. Based on the second dataset, the machine learning algorithm may be updated, as this dataset may comprise data signatures absent in the first dataset. Thus, the machine learning algorithm may be trained and improved to recognize and detect various types of objects, as discussed above.

The robotic mechanism described in FIG. 1 may enable supplying energy to a device, such as vehicle 112. As illustrated, the robotic mechanism may include a base 101, base attachment 102, first pivot mechanism 103, first arm 104, second pivot mechanism 105, second arm 106, and third pivot mechanism 107. In various embodiments, there may be more or fewer bases, base attachments, pivot mechanisms, and arms in the robotic mechanism. The robotic mechanism may operate (e.g., pivot, extend, retract, rotate, grip, open, close, push, pull, pinch, cut, tear, expand, hold, break, etc.) using various techniques. For example, the robotic mechanism may be pneumatically operated, solenoid operated, magnetically operated, motor (e.g., electric, fuel, etc.) operated, hydraulically operated, or operated using various other types of actuators. Using these actuators, the movements and actions discussed herein may be performed.

The robotic mechanism may be operated or controlled (e.g., to pivot, extend, retract, rotate, grip, open, close, push, pull, pinch, cut, tear, expand, hold, break, etc.) based on instructions from a computing device. In this disclosure, the term robotic is intended to cover both completely autonomous operations and also collaborative human-machine (also called cobot) operations. The computing device may be the same as, or separate from, the computing device implementing the above-described machine learning and artificial intelligence techniques.

In some embodiments, the computing device may include a memory. The memory may include one or more storage devices configured to store data for use by programs (e.g., programs carrying out the methods and techniques described herein). The memory may include, but is not limited to, a hard drive, a solid state drive, a CD-ROM drive, a transient or temporary storage device (e.g., a random-access memory (RAM)), a peripheral storage device (e.g., an external hard drive, a USB drive, etc.), a network drive, a cloud storage device, or any other storage device. In some embodiments, the memory may store position or movement data (e.g., indicating positions of camera 109, cap engagement mechanism 110 (or a portion thereof, such as a protruding element as illustrated), nozzle engagement mechanism 111 (or a portion thereof, such as a grip handle as illustrated), vehicle 112 (or a portion thereof), fueling lid 113 (or a portion thereof, such as a center position), a fueling cap or opening (or a portion thereof, such as a center position), or the like. The position or movement data may be in three dimensions (e.g., x, y, z, or pitch, yaw, roll, etc.). In some embodiments, the position or movement data may be in six dimensions (e.g., forward/backward (surge), up/down (heave), and left/right (sway) movement in three perpendicular axes, combined with changes in orientation through rotation about the axes, pitch, yaw, and roll).

In some embodiments, the position or movement data may indicate a location in space of one or more object, as discussed above. The position may be absolute or relative (e.g., relative compared to base 101, base attachment 102, pivots 103/105/107, or arms 104/106, or to another portion of the robotic mechanism illustrated in FIG. 1, or relative compared to camera 109, body 108, cap engagement mechanism 110, or nozzle engagement mechanism 111, or other components). In some embodiments, position or movement data may specify (e.g., through three-dimensional or six-dimensional coordinates, as discussed above) a specific movement, path, or angle for an object to follow.

The movement may include an action such as, for example, pivot, extend, retract, rotate, grip, open, close, push, pull, pinch, cut, tear, expand, hold, break, etc. These actions may be performed by the robotic mechanism (e.g., through its components), by cap engagement mechanism 110, by nozzle engagement mechanism 111, or by other components. As discussed above, these and other types of movements may be performed pneumatically, using a solenoid, using a magnet, using a motor (e.g., electric, fuel, etc.), hydraulically, or via various other types of actuators. Such movements may be specified in terms of accomplishing actions (e.g., opening a fuel tank, closing a lid, pressing a button, etc.). Further, the movements may be defined in terms of numbers of rotations, distances traveled, pressure or force applied, etc. For example, some gas tanks on vehicles with powerful engines may have gas caps that require more turns to open than gas tanks on vehicles with weaker engines. The additional turns may be required because the gasoline in the tank of a powerful vehicle may be pressurized more than in other vehicles, thus mandating a gas cap that can handle that higher pressure. The movement data may accordingly specify a number of turns or rotations, or degrees, required to open a particular gas cap on a particular vehicle 112, based on stored data or machine learning.

Further, the path may specify coordinates for the robotic mechanism, cap engagement mechanism 110, nozzle engagement mechanism 111, or other components to travel. The path may be defined in terms of beginning and ending coordinates; beginning coordinates, one or more intermediate coordinates, and ending coordinates; or other types of coordinates. In some embodiments, the path may include a combination of movements. For example, the path may include pivots 103/105/107 rotating, arms 104/106 extending, cap engagement mechanism 110 or nozzle engagement mechanism 111 rotating, camera 109 obtaining images, cap engagement mechanism 110 pressing its protruding tip, nozzle engagement mechanism 111 gripping a nozzle, or various others.

In some embodiments, the angle of movements may also be calculated or retrieved from memory (e.g., based on machine learning or stored data). For example, based on the type of vehicle 112 being provided with energy, the energy receptacle of vehicle 112 may not receive an energy nozzle (e.g., petroleum nozzle) in a strictly horizontal plane, but instead may be configured to receive the energy nozzle in a downward-pointing plane (e.g., 20 degrees or 40 degrees above horizontal). In such a situation, the path data, as discussed above, may further specify an angle of approach or angle of retreat for moving cap engagement mechanism 110 or nozzle engagement mechanism 111 toward the energy receptacle of vehicle 112. In some embodiments, various other movements and paths, as discussed above, may also have calculated angles of approach or retreat to perform their movements. For example, the robotic mechanism itself (and its components) may have angles of approach or retreat for their movements, and one or more of camera 109, body 108, cap engagement mechanism 110, and nozzle engagement mechanism 111 may have angles of approach or retreat for their movements too.

In accordance with the above machine learning and artificial intelligence techniques, the movement, path, and angle information discussed above may be developed over time. For example, through entirely automatic, partially automatic, or entirely manual training, the movement, path, and angle data (e.g., coordinates) may be developed to perform specific actions (e.g., pivot, extend, rotate, grip, open, close, push, pull, pinch, cut, tear, expand, hold, break, etc.). In such training, one or cameras (e.g., camera 109 and/or external cameras) may be used to capture image data allowing the system 100 to identify objects, perform movements, follow paths, and use angles of approach or retreat.

In some embodiments, before the operations shown in FIG. 1 begin, camera 109 is used to obtain position data used for energy provision operations. For example, using camera 109, system 100 can obtain position data for vehicle 112, lid 113, a cap or nozzle of an energy receptacle of vehicle 112, or a center point of any of the foregoing. In accordance with FIGS. 2-5, discussed below, this position data may be saved by system 100 in memory and used for additional operations.

Figure 2:
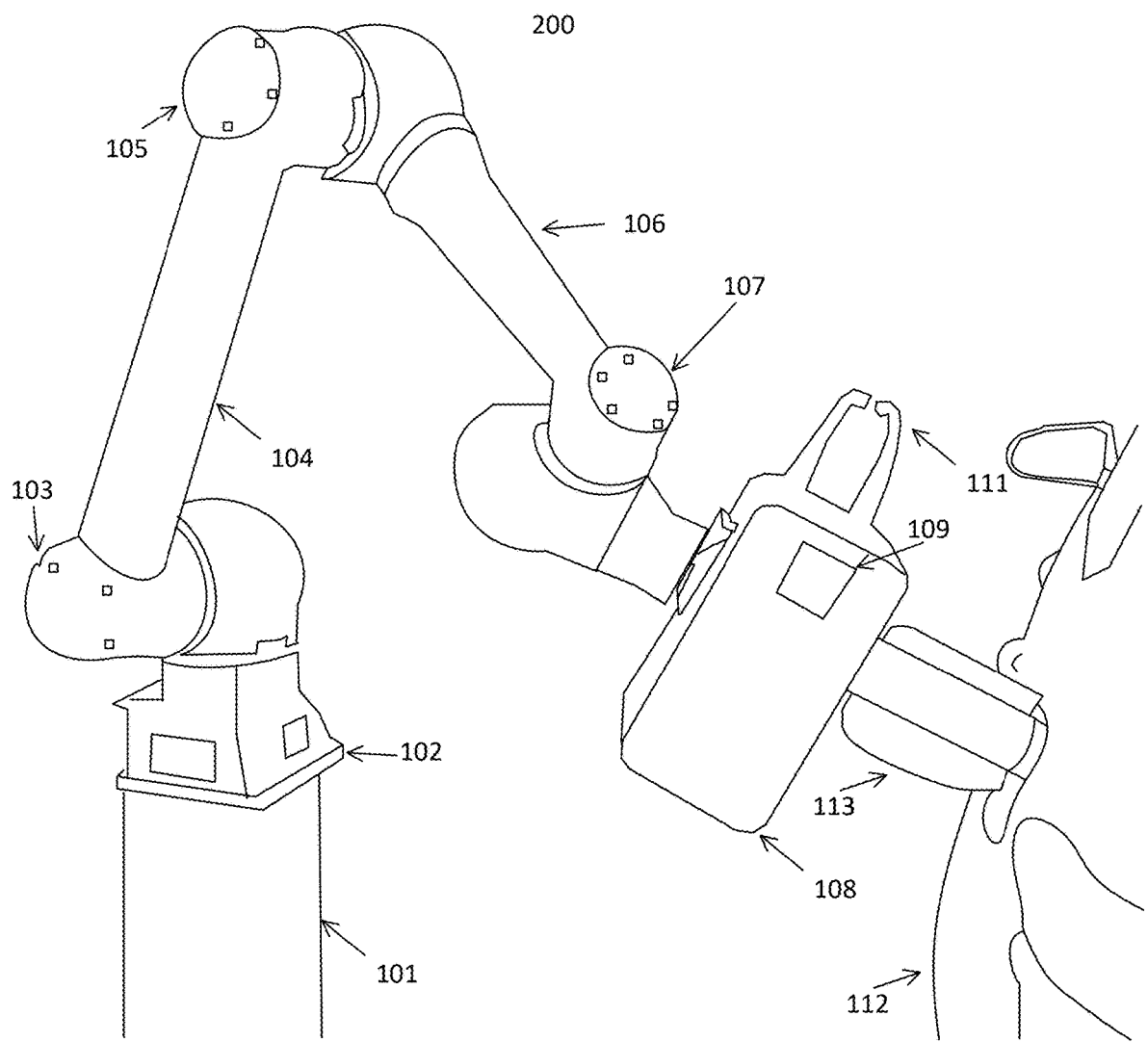
FIG. 2 illustrates an exemplary system for supplying energy to a device, in accordance with disclosed embodiments.

FIG. 2 illustrates an exemplary system 200 for supplying energy to a device, in accordance with disclosed embodiments. FIG. 2 illustrates a continuation of the action illustrated in FIG. 1, which results in providing energy to vehicle 112. Whereas in FIG. 1 cap engagement mechanism 110 is further from a fueling receptacle of vehicle 112, in FIG. 2 cap engagement mechanism 110 is engaging with the fueling receptacle. This engagement may include, for example, turning a fuel cap, opening lid 113, pushing (e.g., popping open) a lid or cap, or performing other actions at vehicle 112 to prepare for fueling. Alternatively, in some embodiments lid 113 may be opened wirelessly or via a command from vehicle 112 itself. In such embodiments, rather than move cap engagement mechanism 110 to engage with vehicle 112, system 100 may send a signal (e.g., wireless) to vehicle 112 to cause lid 113 to open. The signal may be transmitted via various techniques, such as a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. As a further example, in some embodiments system 100 may communicate with an application (e.g., mobile app), and may cause a prompt to be generated via the application. The prompt may ask the user (e.g., driver of vehicle 112) if they wish to begin an automated fueling process, or consent to opening lid 113. The user may then provide input via the application, which may allow system 100 to continue operating or may allow lid 113 to open.

As shown in FIG. 2, pivots 103/105/107 may move (e.g., rotate, pivot, etc.) to enable arms 104/106 to move. In some embodiments, arms 104/106 may also extend (e.g., telescope, etc.) or retract. Further, this robotic mechanism may correspondingly move the gripper device, including body 108, camera 109, cap engagement mechanism 110, and nozzle engagement mechanism 111, or cause them to perform other actions as discussed above. In accordance with above embodiments, these movements and actions may be based on coordinate data, or may be defined in terms of actions to perform. Further, these movements and actions may have defined paths, angles of approach or retreat, or other parameters, as discussed above.

Figure 3:
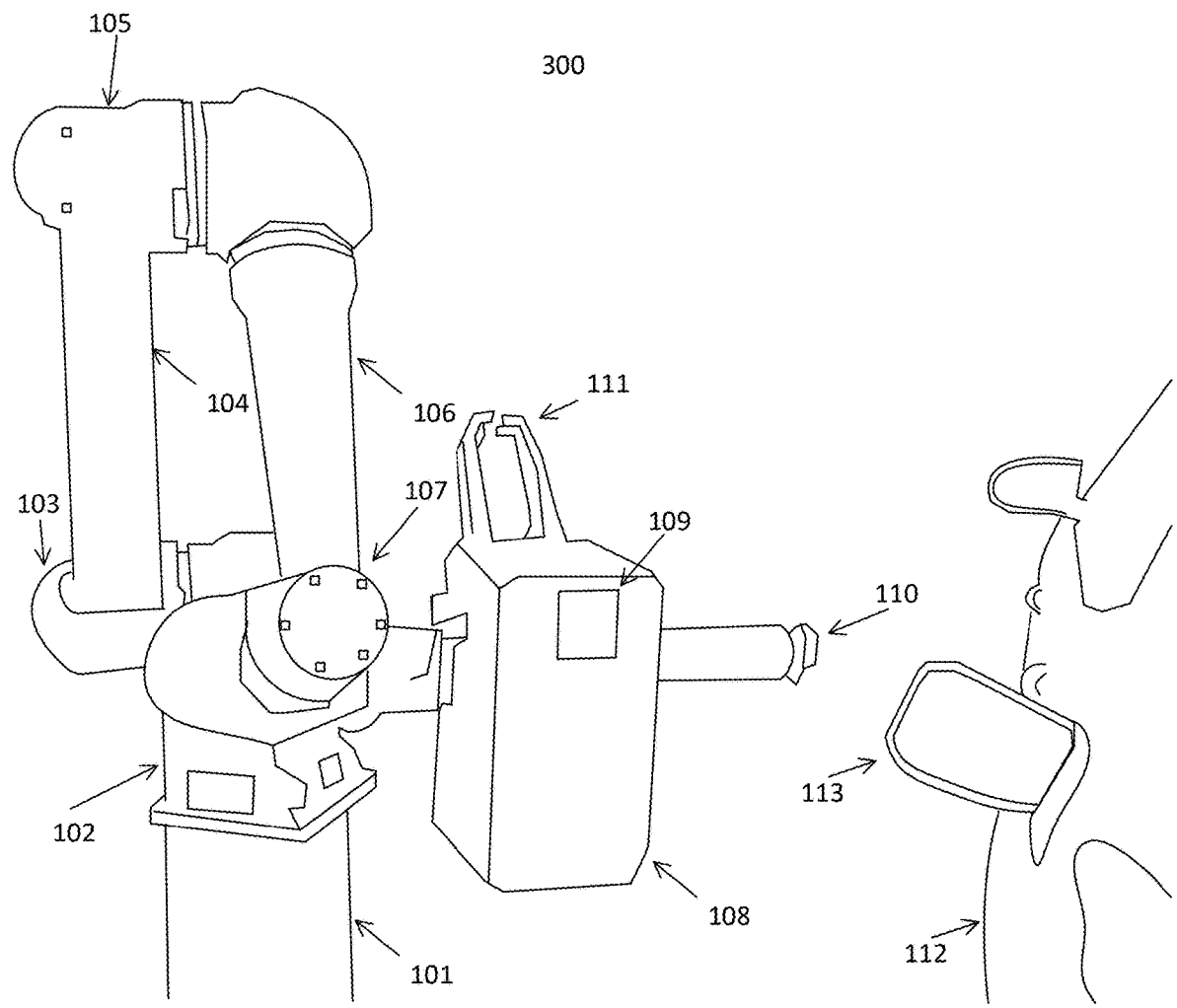
FIG. 3 illustrates an exemplary system for supplying energy to a device, in accordance with disclosed embodiments.

FIG. 3 illustrates an exemplary system 300 for supplying energy to a device, in accordance with disclosed embodiments. FIG. 3 illustrates a continuation of the action illustrated in FIGS. 1 and 2, which results in providing energy to vehicle 112. In accordance with FIG. 3, cap engagement mechanism 110 may have opened or removed a fuel cap of vehicle 112. With this cap removed or open, vehicle 112 can accept energy via its energy receptacle. FIG. 3 thus illustrates the robotic mechanism retreating the gripper device from vehicle 112.

Figure 4:
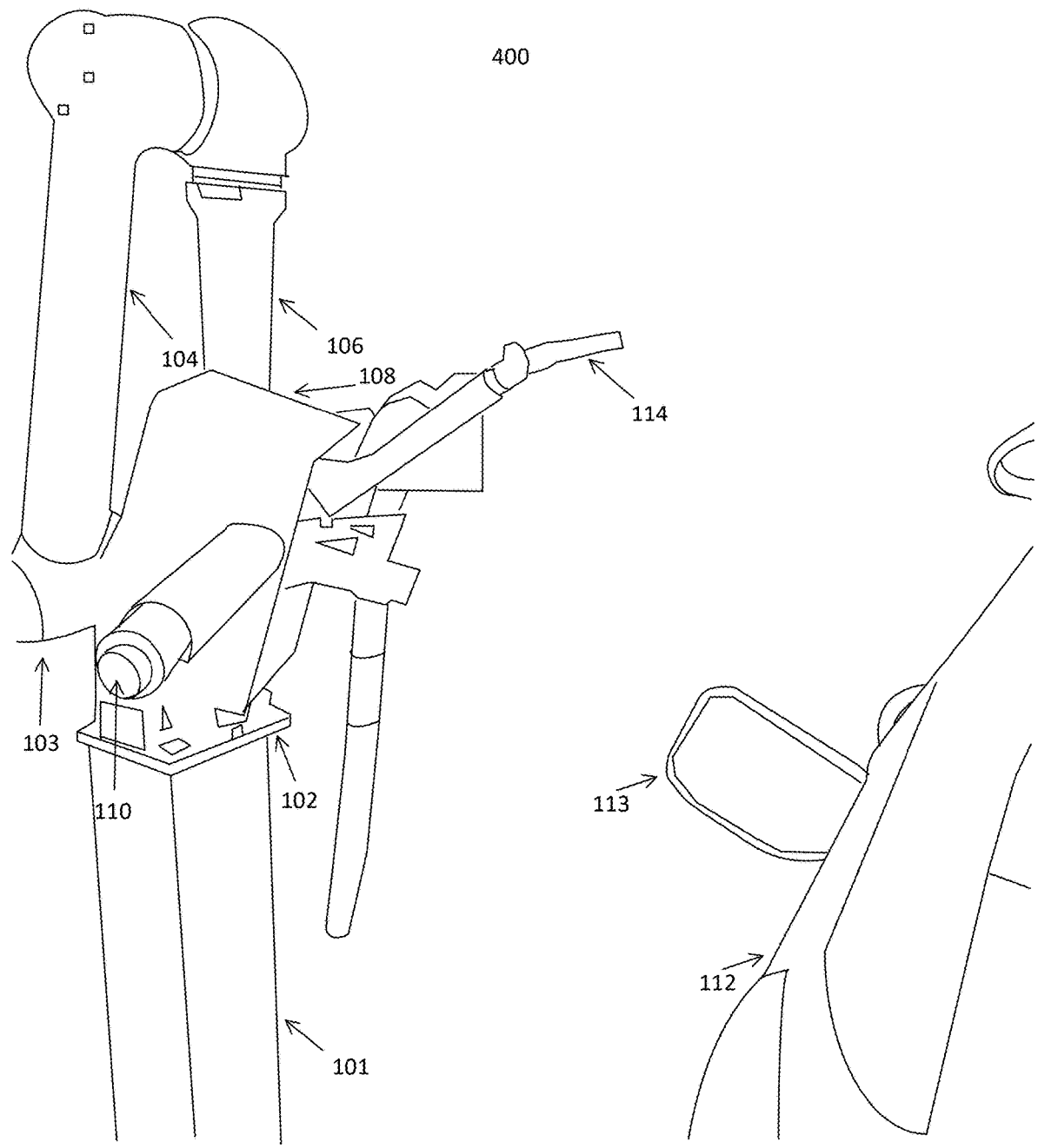
FIG. 4 illustrates an exemplary system for supplying energy to a device, in accordance with disclosed embodiments.

FIG. 4 illustrates an exemplary system 400 for supplying energy to a device, in accordance with disclosed embodiments. FIG. 4 illustrates a continuation of the action illustrated in FIGS. 1-3, which results in providing energy to vehicle 112. In accordance with FIG. 4, the robotic mechanism may rotate so that camera 109 is facing away from vehicle 112 and nozzle engagement mechanism 111 is moved toward an energy apparatus (e.g., gas pump nozzle, electric charger, etc.).

In accordance with above embodiments, nozzle engagement mechanism 111 may engage with the energy apparatus in various ways. For example, nozzle engagement mechanism 111 may grip, squeeze, or otherwise engage with a handle of a pump, a holding element or a pump or cable, or various other components of an energy apparatus. As discussed further below, the engagement may be performed in several different ways using a variety of techniques (e.g., pneumatically, via a solenoid, via a motor (e.g., electric, fuel, etc.), magnetically, hydraulically, or operated using various other types of actuators). Consistent with above embodiments, the robotic mechanism illustrated in FIG. 4 may move nozzle engagement mechanism 111 into a proper position to engage with the energy apparatus or a component thereof. This movement may be based on positions (e.g., coordinates), paths, and/or angles of approach or retreat.

Figure 5:
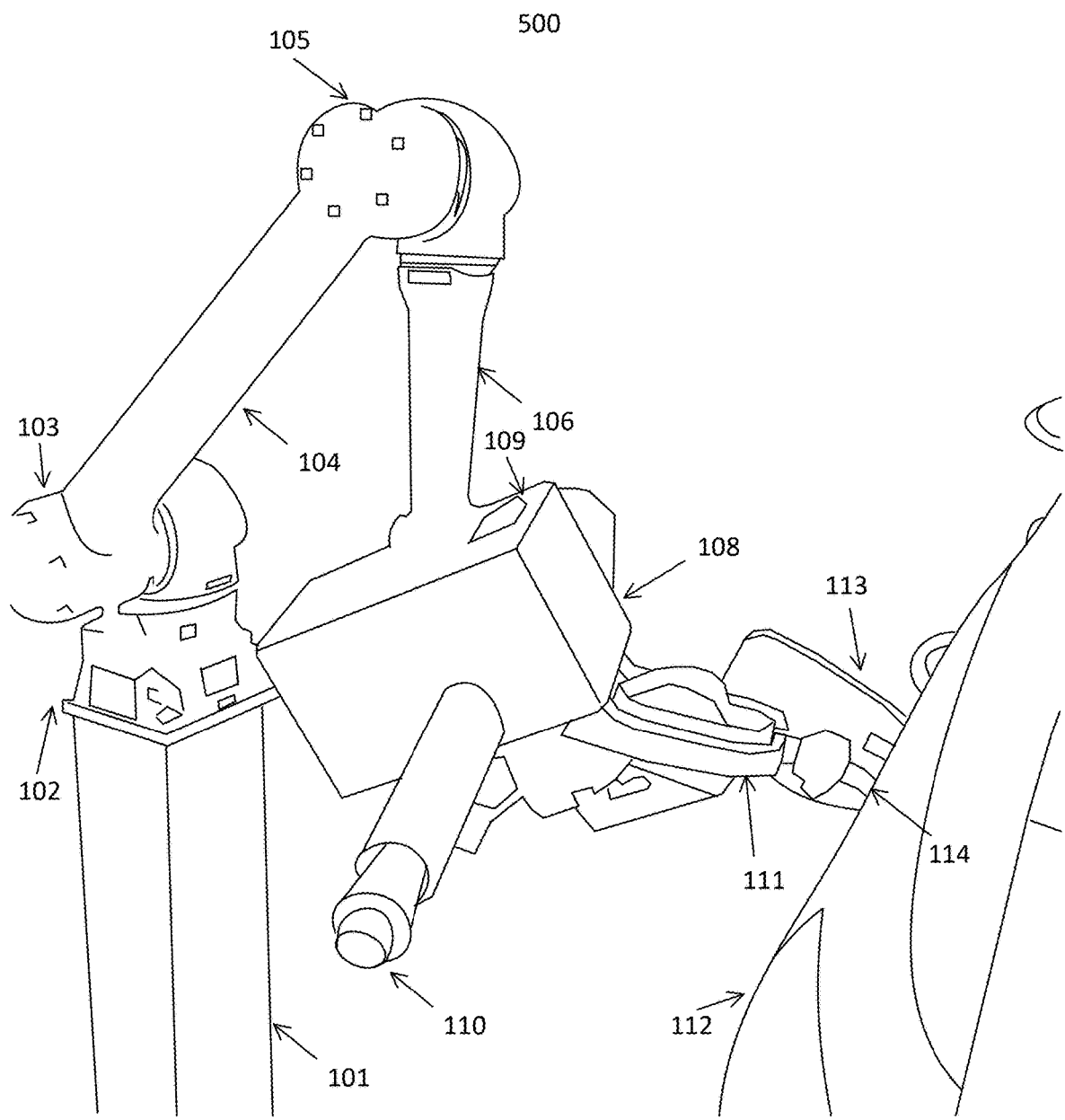
FIG. 5 illustrates an exemplary system for supplying energy to a device, in accordance with disclosed embodiments.

FIG. 5 illustrates an exemplary system 500 for supplying energy to a device, in accordance with disclosed embodiments. FIG. 5 illustrates a continuation of the action illustrated in FIGS. 1-4, which results in providing energy to vehicle 112. In accordance with FIG. 5, the robotic mechanism may rotate so that camera 109 and/or cap engagement mechanism 110 are facing away from vehicle 112. The robotic mechanism may move nozzle engagement mechanism 111 into a proper position to begin providing energy (e.g., fueling, electrifying, etc.) vehicle 112.

The robotic mechanism illustrated in FIG. 5 may have previously recorded position data (e.g., coordinates, a path, and/or an angle of approach or retreat) for providing energy to vehicle 112. That is, using camera 109 or another camera, system 500 may store position data for the fueling receptacle of vehicle 112. In some embodiments, the position data may be a cap, opening, plug, hole, or the like, or a center location thereof. Using this stored position data, system 500's robotic mechanism can move the energy provision apparatus to the correct locating for providing energy to vehicle 112. Notably, in some embodiments, system 500 is able to accomplish this energy provision "blind." That is, even though camera 109 (or another camera) is facing away from vehicle 112 and its energy receptacle, the stored position data enables system 500 to provide energy even without continuous or current "vision" via camera 109. Similarly, even though camera 109 (or another camera) may not face an energy supplying device (e.g., fueling terminal, fueling nozzle, cord, handle, etc.), it likewise may be able to engage with such objects via nozzle engagement mechanism 111 using stored position data.

Figure 6:
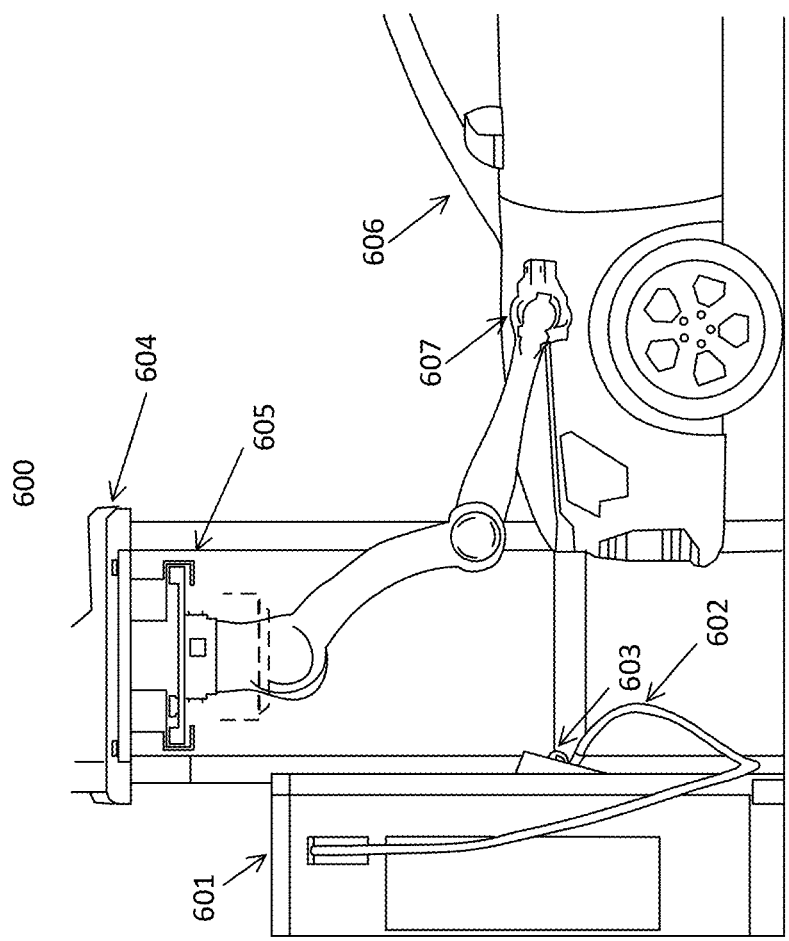
FIG. 6 illustrates an exemplary system for supplying energy to a device, in accordance with disclosed embodiments.

FIG. 6 illustrates an exemplary system 600 for supplying energy to a device, in accordance with disclosed embodiments. As illustrated, system 600 may include one or more robotic mechanisms 605, which may be similar to those discussed above in connection with FIGS. 1-5. That is, robotic mechanism 605 may have one or more attachment, one or more pivot, one or more arm, one or more cap engagement mechanism, and one or more nozzle engagement mechanism. Unlike FIGS. 1-5, however, where the robotic device was ground-mounted, in FIG. 6 robotic mechanism 605 is illustrated as overhead-mounted. For example, robotic mechanism 605 may be mounted via mount 604 to a ceiling, overhang, cover, wall, or the like.

Consistent with above embodiments, robotic mechanism 605 may use one or more cameras to identify objects of interest (e.g., energy station 601, cord or line 602, nozzle or handle 603, vehicle 606, or receptacle 607), and/or center points thereof. Using this stored location (e.g., position, path, and/or angle of approach or retreat) information, robotic mechanism 605 may position its one or more pivot, one or more arm, one or more cap engagement mechanism, and/or one or more nozzle engagement mechanism to provide energy from station 601 to vehicle 606.

Figure 7:
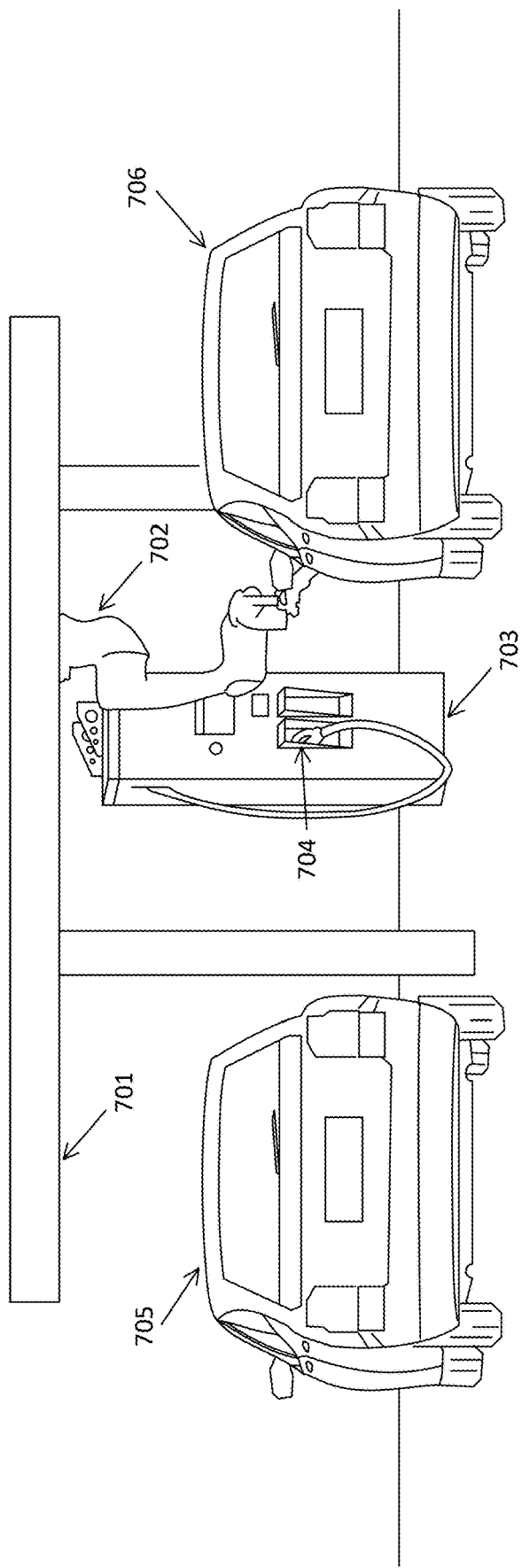
FIG. 7 illustrates an exemplary energy supply system for supplying energy to multiple devices, in accordance with disclosed embodiments.

FIG. 7 illustrates an exemplary energy supply system 700 for supplying energy to multiple devices, in accordance with disclosed embodiments. In most respects, system 700 may include the components and functionality described above in connection with FIGS. 1-6. In system 700, however, multiple vehicles 705/706 may be provided with energy by a single robotic mechanism 702. For example, system 700 may contain one or more energy stations 703, each of which may be configured to service two or more vehicles 705/706. In accordance with above embodiments, robotic mechanism 702 may obtain position data for various objects such as energy station 703, its cord or line, its nozzle or handle 704, vehicles 705/706, or receptacles of vehicles 705/706, and/or center points thereof. Using this position data, and the machine learning or artificial intelligence techniques discussed above, system 700 may enable a given energy station 703 to supply energy to multiple vehicles 705/706.

Figure 8A:
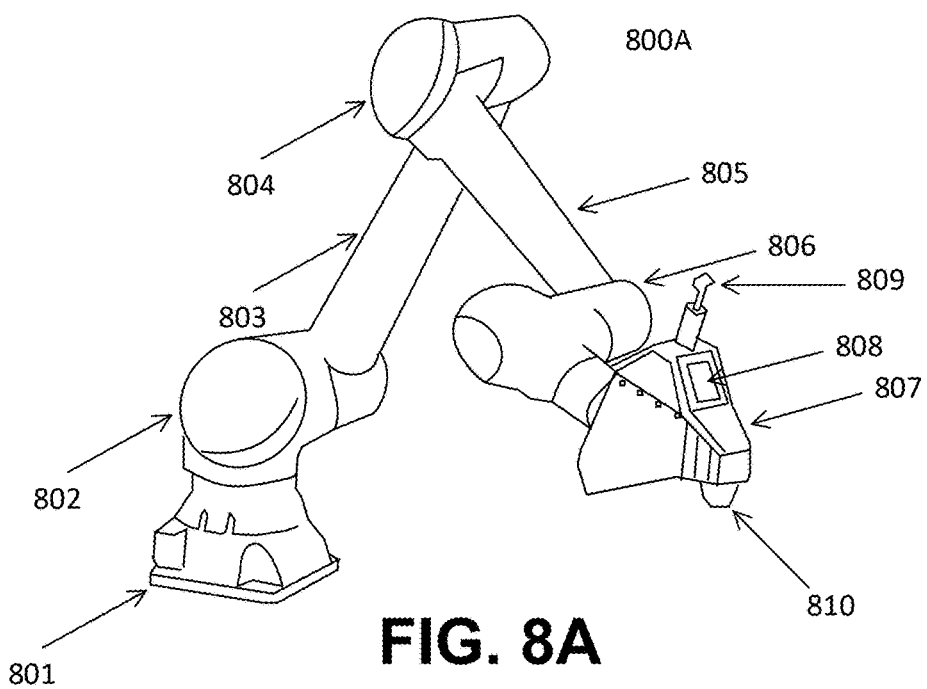
FIGS. 8A-8B illustrate an exemplary movable member for supplying energy to a device, in accordance with disclosed embodiments.
Figure 8B:
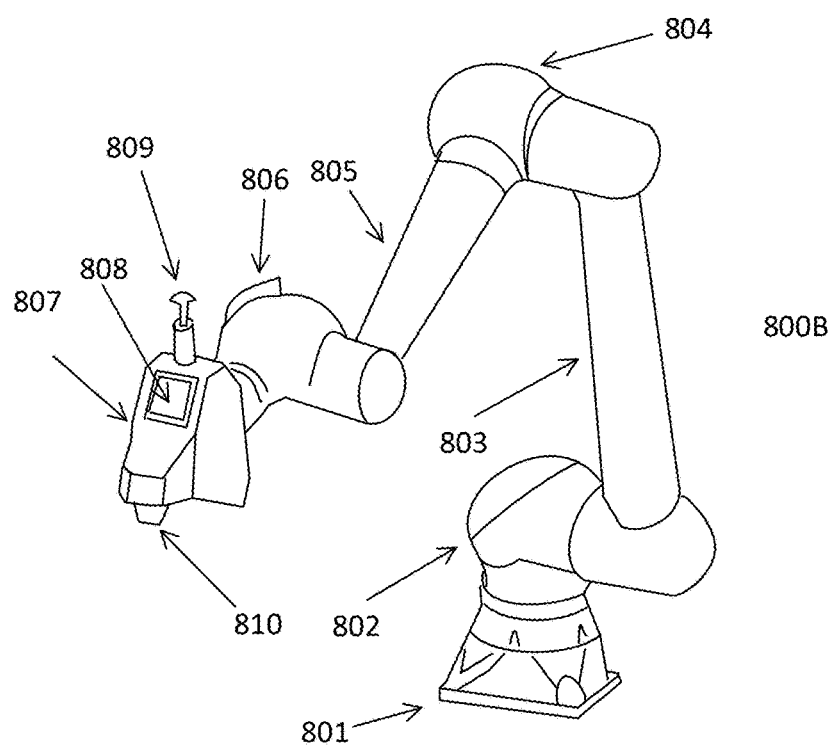

FIGS. 8A-8B illustrate an exemplary movable member 800A/800B for supplying energy to a device, in accordance with disclosed embodiments. In accordance with FIGS. 1-5, movable member 800A/800B may contain components and functionality similar to the robotic mechanism discussed above. For example, movable member 800A/800B may have one or more base 801, pivots 802/804/806, arms 803/805, and gripper devices 807. Gripper devices 807 may have components as discussed above, such as one or more camera 808 and cap engagement mechanism 809. While FIGS. 1-5 illustrate robotic mechanics in an exemplary embodiment of performing fueling from a fuel pump, FIGS. 8A and 8B illustrate an exemplary embodiment of charging an electric vehicle. Accordingly, gripper device 807 may include a gripping mechanism 810 for engaging with an electric charging component (e.g., handle, cord, grip, etc.). Accordingly, just as the robotic mechanisms discussed above were configured to grasp a fueling nozzle and supply fuel to a vehicle, the robotic mechanisms of FIGS. 8A and 8B are configured to grasp an electric charging cable and charge an electric vehicle. Additional exemplary details of gripper device 807 are discussed below in connection with FIGS. 10-11.

Figure 9A:
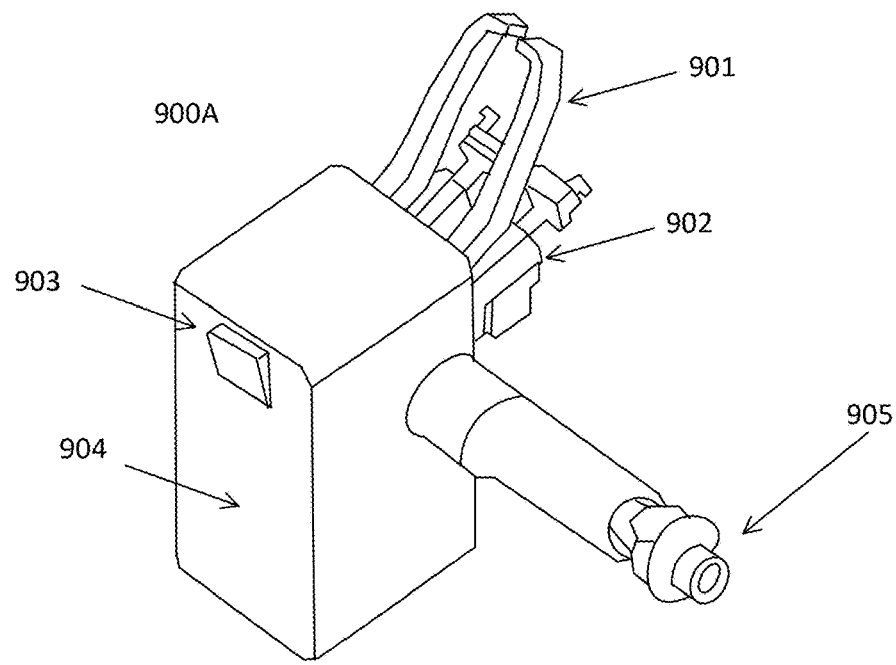
FIGS. 9A-9B illustrate an exemplary multifunction gripper device, in accordance with disclosed embodiments.
Figure 9B:
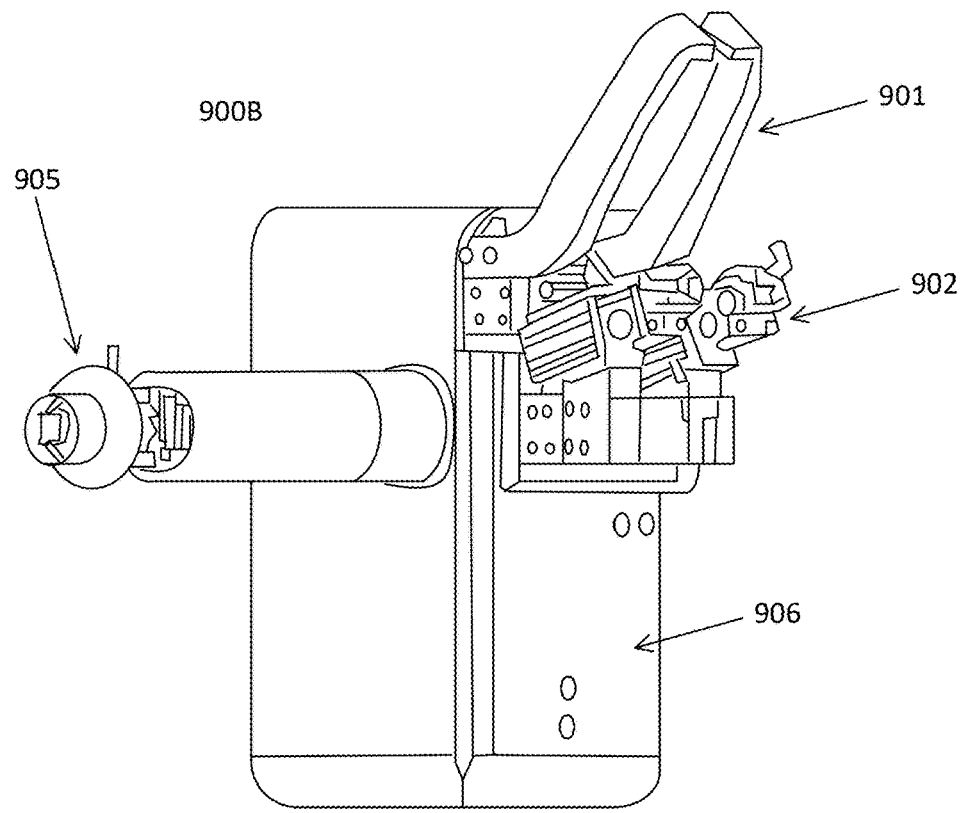

FIGS. 9A-9B illustrate an exemplary multifunction gripper device 900A/900B, in accordance with disclosed embodiments. In some embodiments, multifunction gripper device 900A/900B may be formed through a three-dimensional printing process. That is, multifunction gripper device 900A/900B may be formed as a single physical unit, as its individual parts may be formed and then assembled. Alternatively, three-dimensional printing is not used, and instead multifunction gripper device 900A/900B is assembled from parts as described herein.

Consistent with the above disclosure in FIGS. 1-5, gripper device 900A/900B may include one or more body 904, which may include one or more flat surface, curved surface, or other angled surface. In some embodiments, one or more sides or components of body 904 may be a plate 906. For example, plate 906 may be removable using fasteners (e.g., screws, etc.), an adhesive, Velcro, a lockable mechanism, or the like. Removing or opening plate 906 may allow access to the inside components of gripper device 900A/900B, which may include control circuitry, one or more actuator for controlling movements of cap engagement mechanism 905 or nozzle engagement mechanism 901, or the like. As illustrated, gripper device 900A/900B may also include one or more camera 903, one or more cap engagement mechanism 905, and one or more nozzle engagement mechanism 901.

In some embodiments, nozzle engagement mechanism 901 may operate grasp a fueling handle, nozzle, or other component at a fueling station. In such embodiments, as illustrated above in FIG. 5, actuator 902 may be used to control the supply of energy from the energy source. For example, actuator 902 may perform operations such as pivot, extend, rotate, grip, open, close, push, pull, pinch, cut, tear, expand, hold, break, etc.), or various other operations. These operations, in one exemplary embodiment, may allow actuator 902 to squeeze a trigger of a fuel pump, thus allowing fuel to flow to a vehicle. Of course, other types of operations in other energy provision embodiments are possible as well.

Consistent with above embodiments, cap engagement mechanism 905 may function in various ways to interact with an energy supply lid, cap, cover, film, plug, or the like. For example, cap engagement mechanism 905 may be configured to move (e.g., extend, retract, etc.) to push, pull, rotate (e.g., via a rotating head), grip, squeeze, unlock, or the like. Using cap engagement mechanism 905 in this manner, the energy supply lid, cap, cover, film, plug, etc. may be opened or removed, to allow energy provision to a device. Like nozzle engagement mechanism 901, cap engagement mechanism 905 may operate via various types of actuators, such as a motor, pneumatically, via a solenoid, via a magnet, or various other ways as described herein.

While FIGS. 9A-9B illustrate nozzle engagement mechanism 901 and cap engagement mechanism 905 as separate, in some embodiments they may be one and the same. That is, a single mechanism may function to both engage with a nozzle and engage with a cap, in accordance with disclosed embodiments. In addition, as discussed above, nozzle engagement mechanism 901 and cap engagement mechanism 905, if separate, may be located on the same or different faces or planes of body 904. For example, nozzle engagement mechanism 901 and cap engagement mechanism 905 may be on sides of body 904 separated by ninety degrees, one-hundred and eighty degrees, or other configurations.

Consistent with above embodiments, gripper device 900A/900B may move and operate according to instructions from a computing system. The instructions, which may be developed through machine learning or artificial intelligence techniques as discussed above, may specify a position (e.g., coordinates), path, and/or angle of movement for gripper device 900A/900B. These instructions may enable gripper device 900A/900B to engage with a fueling handle, grip, nozzle, or the like, and move into position to supply energy to a machine, such as a vehicle.

In some embodiments, gripper device 900A/900B may be pressurized. For example, gripper device 900A/900B may have within its body 904 a pressure source such that its internal air pressure is higher than that surrounding gripper device 900A/900B (i.e., an ambient or external air pressure). According to such embodiments, because the air pressure within gripper device 900A/900B may be higher than an outside air pressure, gripper device 900A/900B may protect against outside fluids (e.g., gases or liquids) from entering gripper device 900A/900B. This may be especially advantageous in hazardous environments where there are potentially explosive or flammable fluids in the environment of gripper device 900A/900B. By preventing or restricting the seepage of such fluids into gripper device 900A/900B, the risk of such fluids reaching electrical circuitry or potential spark-causing elements within gripper device 900A/900B may be diminished, thus enhancing safety.

The increased air pressure within gripper device 900A/900B may be achieved in several ways. For example, in some embodiments gripper device 900A/900B may have an air intake enter its body 904, such that air (pressurized or not) is continuously or periodically provided into body 904. The air intake may include a hose, tube, pipe, or the like. In some embodiments, the pressurization may be achieved via a compressor. For example, an air compressor may be included within body 904 or outside of body 904, providing pressurization within body 904. As a further example, a fan or blower may be used to obtain pressurization within body 904. The pressurization within body 904 may be maintained either through sealing (e.g., air-tight or nearly air-tight) body 904, or by continuously or periodically supplying air or pressurized air to body 904.

In some embodiments, to achieve further safety in environments with potentially explosive or flammable fluids, gripper device 900A/900B may operate its cap engagement mechanism 905, nozzle engagement mechanism 901, and/or actuator 902 through techniques that do not result in risks of ignition. For example, such elements of gripper device 900A/900B may be operated pneumatically in some embodiments, such that no circuitry or sparks are generated outside of gripper device 900A/900B.

In further embodiments, gripper device 900A/900B may be internally heated or cooled. For example, depending on the external temperature in which gripper device 900A/900B is used, heating or cooling may be advantageous to ensure the proper functioning (e.g., electrically and/or mechanically) of gripper device 900A/900B. Accordingly, a heating element (e.g., heating coil, wire, light, etc.) or cooling element (e.g., refrigeration device, fan, etc.) may be housed in gripper device 900A/900B and may be controlled to provide heating or cooling as needed.

Figure 10:
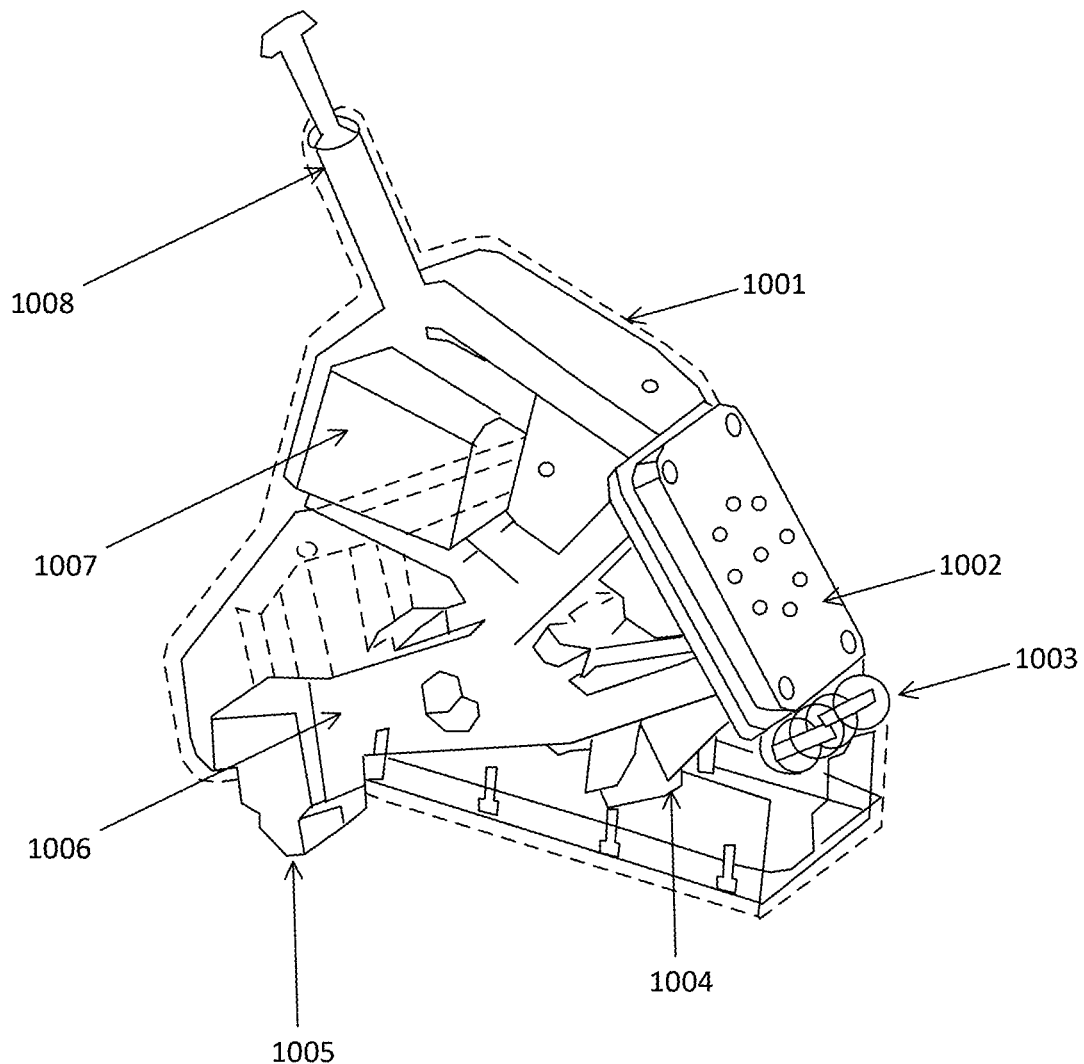
FIG. 10 illustrates an exemplary multifunction gripper device, in accordance with disclosed embodiments.

FIG. 10 illustrates an exemplary multifunction gripper device 1000, in accordance with disclosed embodiments. While the gripper device 900A/900B illustrated in FIGS. 9A and 9B was shown as configured for engaging with a fuel pump, grip, or handle, multifunction gripper device 1000 is illustrated in an exemplary embodiment of gripping an electric vehicle charger grip, handle, or cable.

As shown in FIG. 10, multifunction gripper device 1000 may include a body 1001 and flange or plate 1002. Consistent with the discussion above, flange or plate 1002 may be removable in some embodiments to access the interior of multifunction gripper device 1000. Further, multifunction gripper device 1000 may include one or more connector 1003, which may supply power and/or communications to multifunction gripper device 1000. For example, one or more conductors of connector 1003 may be configured to receive electrical power (e.g., AC or DC), and one or more conductors may be configured to receive and transmit signals. These conductors may be common (e.g., Power over Ethernet, or the like) or separate. As discussed above, signals received via connector 1003 may be used to instruct multifunction gripper device 1000 how to operate (e.g., move, perform actions, etc.). Alternatively, multifunction gripper device 1000 may include a wireless communications interface, through which it may send and receive communications signals.

In the illustrative embodiment shown, multifunction gripper device 1000 may also include one or more electromagnetic relay input/output 1004. Accordingly, electromagnetic relay input/output 1004 may act as a switch or control inside multifunction gripper device 1000. Further, multifunction gripper device 1000 may include charge holder (e.g., an electromagnet) 1005, a chassis 1006, a camera 1007 (e.g., 2D or 3D, as discussed above), and engagement mechanism 1008. By operation of electromagnet relay input/output 1004, multifunction gripper device 1000 may cause engagement mechanism 1008 to extend or retract, according to signals received via connector 1003. As discussed above, in addition to extending and retracting, in various embodiments engagement mechanism 1008 may perform other operations as well, such as pivot, rotate, grip, open, close, push, pull, pinch, cut, tear, expand, hold, break, etc.

Figure 11:
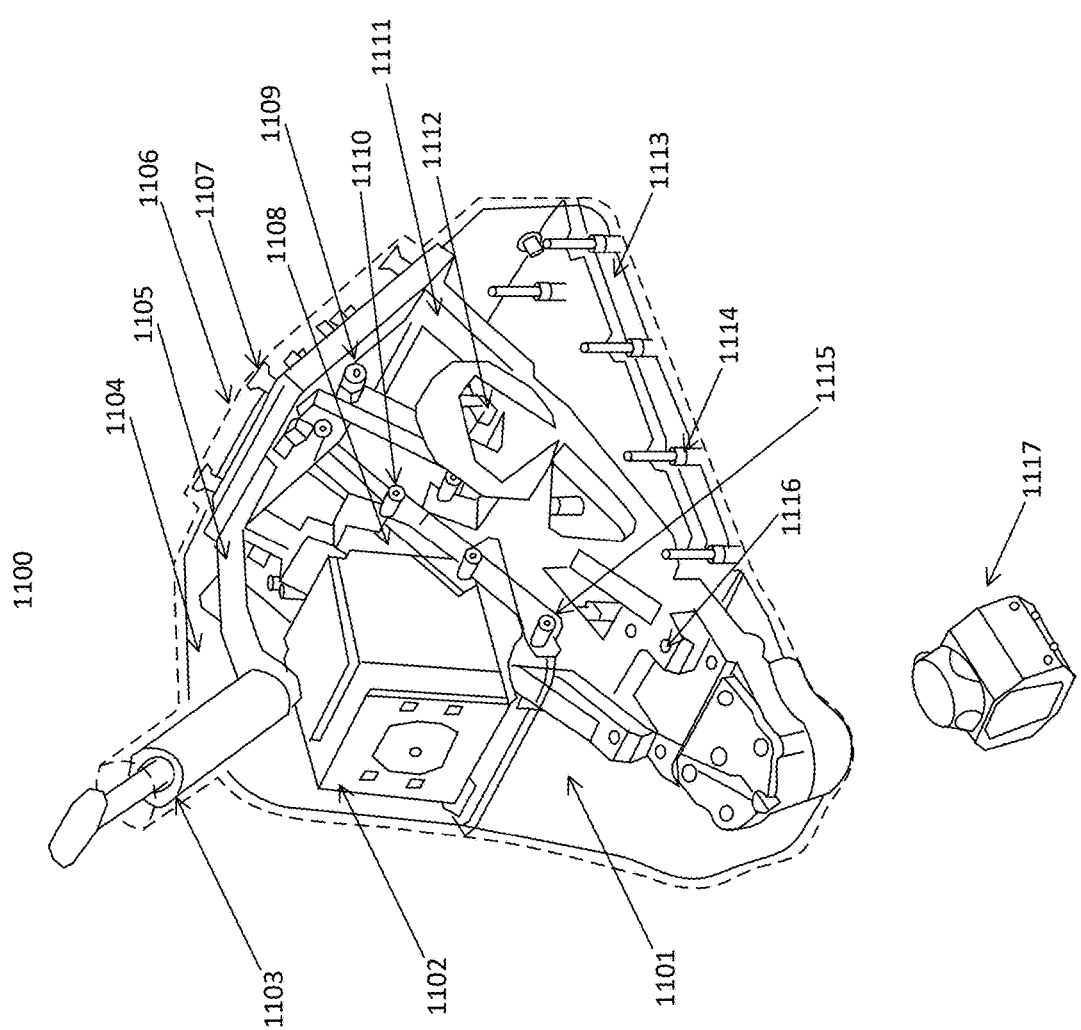
FIG. 11 illustrates an exemplary multifunction gripper device, in accordance with disclosed embodiments.

FIG. 11 illustrates an exemplary multifunction gripper device 1100, in accordance with disclosed embodiments. As illustrated, multifunction gripper device 1100 presents another view of multifunction gripper device 1000, together with a grasping mechanism 1117. Grasping mechanism 1117 may function to grasp (e.g., clamp, squeeze, etc.) an energy supply component such as a charging cable, handle, grip, or the like. In accordance with above embodiments, grasping mechanism 1117 may be actuated using various techniques, such as pneumatically operated, solenoid operated, motor (e.g., electric, fuel, etc.) operated, magnetically operated, hydraulically operated, or operated using various other types of actuators.

Consistent with FIG. 10, multifunction gripper device 1100 may include a main body 1101, plate with camera 1102, cap engagement mechanism 1103, body top 1104, chassis part (e.g., aluminum or otherwise) 1105, plate 1106, fasteners 1107, chassis part (e.g., aluminum or otherwise) 1108, fasteners 1109, fasteners 1110, frame assembly 1111, chassis part (e.g., aluminum or otherwise) 1112, base 1113, fasteners 1114, fasteners 1115, and fasteners 1116. Of course, other implementations of multifunction gripper device 1100, containing fewer or additional components, are possible as well. In some embodiments, chassis part 1105 may hold a suspension pin that opens and/or closes a lid (e.g., lid 113, as discussed above). In further embodiments, chassis part 1108 may be a part of the gripper device that holds camera 1102 in a specific place. Precisely and accurately positioning camera 1102 using chassis part 1108 may be helpful to ensure camera 1102 is properly calibrated and functioning.

FIGS. 12A-12B illustrate an exemplary multifunction gripper device 1200A/1200B, in accordance with disclosed embodiments. In accordance with above embodiments, multifunction gripper device 1200A/1200B may resemble those discussed above in connection with FIGS. 10 and 11. For example, multifunction gripper device 1200A/1200B may have a body 1201, cap engagement mechanism 1202, and camera 1205. Further, multifunction gripper device 1200A/1200B may have a grasping mechanism 1203 for grasping an energy supply cable 1204. Consistent with above embodiments, grasping mechanism 1203 may grasp energy supply cable 1204 using various techniques. For example, grasping mechanism 1203 may be pneumatically operated, solenoid operated, motor (e.g., electric, fuel, etc.) operated, hydraulically operated, magnetically operated, or operated using various other types of actuators.

In some embodiments, as discussed above, multifunction gripper device 1200A/1200B be pressurized. That is, consistent with the above disclosure, the interior of multifunction gripper device 1200A/1200B, within body 1201, may have an air pressure higher than that surrounding multifunction gripper device 1200A/1200B. In such embodiments, multifunction gripper device 1200A/1200B may be adapted to prevent or minimize the entry of outside fluids into multifunction gripper device 1200A/1200B. This may help achieve the safety benefits discussed above.

FIGS. 13A-13B illustrate an exemplary movable robotic device 1300A/1300B for automatically enabling supply of energy to a machine, in accordance with disclosed embodiments. Consistent with the above disclosure, movable robotic device 1300A/1300B may supply energy to various types of machines, such as vehicles, robots, drones, appliances, equipment, machines, etc.

In some embodiments, movable robotic device 1300A/1300B may have body 1301 housing control circuitry, memory, and/or movement actuators. For example, body 1301 may include one or more processors executing instructions stored in computer memory, which may include instructions for moving movable robotic device 1300A/1300B, performing operations (e.g., pivot, extend, rotate, grip, open, close, push, pull, pinch, cut, tear, expand, hold, break, etc.), or performing other actions. As discussed above, movable robotic device 1300A/1300B may move according to various techniques, such as via wheels 1302, tracks, treads, suction cups, and the like. In accordance with FIGS. 13A and 13B, movable robotic device 1300A/1300B may also include one or more robotic mechanisms 1303, such as those discussed above in connection with FIGS. 1-5. Further, movable robotic device 1300A/1300B may include one or more gripper device 1304, which may include various components as discussed above (e.g., one or more camera, cap engagement mechanism, nozzle engagement mechanism, etc.). In accordance with FIGS. 13A and 13B, movable robotic device 1300A/1300B may be configured to move into proximity to a vehicle and to provide energy to the vehicle. As discussed above, this movement of movable robotic device 1300A/1300B and/or its robotic mechanism 1303 may be accomplished according to stored position, path, and/or angle of approach or retreat data. Accordingly, in some embodiments a device receiving power may be stationary, and movable robotic device 1300A/1300B may itself move into proximity to the device to provide energy.

Figure 14:
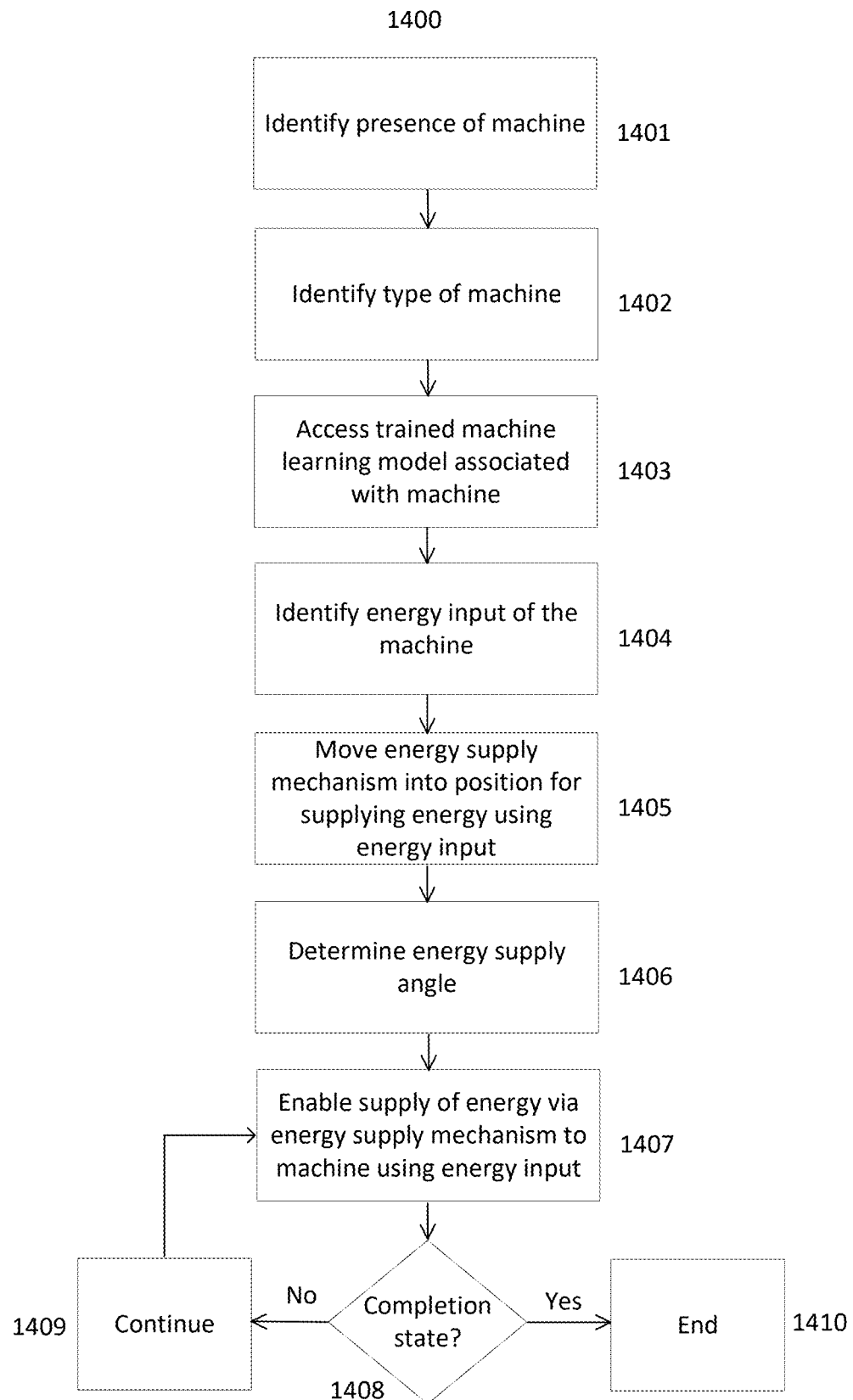
FIG. 14 illustrates an exemplary process for automatically supplying energy to a machine through machine learning and machine vision techniques, in accordance with disclosed embodiments.

FIG. 14 illustrates an exemplary process 1400 for automatically supplying energy to a machine through machine learning and machine vision techniques, in accordance with disclosed embodiments. In accordance with the above discussion, process 1400 may be implemented by various components in the system environments shown in FIGS. 1-7. For example, process 1400 may be implemented by a computing system within a robotic mechanism, as discussed above, or at a separate computing device, as also discussed above. In other embodiments, process 1400 may be carried out by a combination of two or more such computing systems.

In some embodiments, process 1400 may include an operation 1401 of identifying, based on first image data from one or more cameras, a presence of the machine. For example, the image data may come from camera 109 as discussed above in connection with FIGS. 1-5, or another camera in such system environments. The presence of the machine (e.g., vehicle 112, or another device that receives power) be detected by basic techniques (e.g., sensing motion, determining a proximity of a detected object, etc.)

or by more specific techniques such as license plate identification, app identification, or other identifiers of a particular device.

In some embodiments, operation 1401 may determine that a device (e.g., vehicle, etc.) is located in a particular area. For example, operation 1401 may determine that the device is located within a designated zone, located at designated coordinates, located relative to a designated line, stripe, parking spot, storage location, or other marker, etc. Using such techniques, operation 1401 may confirm that the device is located in a predetermined location, such that the remainder of process 1400 may continue.

Process 1400 may further include an operation 1402 of identifying a type of machine. For example, using images from camera 109 or another camera, together with the machine learning or artificial intelligence techniques discussed above, particular vehicle types may be classified via image recognition or shape recognition. Alternatively, in embodiments where camera 109 or another camera recognizes a license plate of a vehicle, the license plate identifier may be cross-referenced with a particular vehicle type in operation 1402. In further embodiments, operation 1402 may identify a type of device based on a signal received from the device or an app (e.g., an app used by the driver).

Process 1400 may further include an operation 1403 of accessing a trained machine learning model associated with the machine. Consistent with the embodiments discussed above in connection with FIGS. 1-5, such a machine learning or artificial intelligence model may support multiple different functions. For example, such a model may determine movement, action, path, or angle instructions for the robotic mechanism as discussed above. Further, such a model may determine a type of device (e.g., vehicle), a location of a fueling receptacle on the device, a center point of the fueling receptacle, a number of turns needed to open a cap on the receptacle, a force to use to press the receptacle or its lid, an amount of energy to provide to the device, numerals of a license plate or other device identifier, a location of the device, and more. Consistent with above embodiments, the machine learning or artificial intelligence model may be trained to implement such determinations and classifications. The model may be implemented locally within the robotic mechanism as discussed above, separate from the robotic mechanism but within the local system environment of FIGS. 1-5, or remotely at a separate computing device (e.g., server).

Process 1400 may further include an operation 1404 of identifying, based on the trained machine learning model and second image data from the one or more cameras, an energy input of the machine. As discussed above, the energy input may be a receptacle on a device, such as a lid, cap, opening, nozzle, film, plug, connector, valve, or the like. The input may be configured to receive an energy source, such as gasoline, diesel, biodiesel, propane, electricity, natural gas, ethanol, methane, hydrogen, etc. In some embodiments, operation 1404 includes identifying the energy input itself. In other embodiments, operation 1404 may include identifying a center point, circumference, diameter, radius, perimeter, or the like, associated with the energy input. In accordance with above embodiments, this location information may be stored (e.g., as coordinates) for use in subsequent operations of moving a robotic device into position to supply energy at the input. In some embodiments, as discussed above, this may be done in the "blind," without an ongoing or current camera view of the energy input, since the energy input location has been stored.

Process 1400 may further include an operation 1405 of moving an energy supply mechanism into a position for supplying energy using the energy input. As discussed above, for example regarding FIGS. 1-7, a robotic mechanism may be movable (e.g., via pivots, arms, and/or gripper devices) to move to a position based on the identified energy input from operation 1404. Further, in some embodiments, the robotic mechanism may move from above (e.g., on a track) or on the ground (e.g., via wheels, a track, suction cups, treads, etc.). Consistent with above embodiments, this robotic mechanism may move into an energy supply location based on position data (e.g., coordinates), path data, and/or angle of approach or retreat data. The robotic mechanism may accomplish this movement either with a constant or continuous camera view of the device being supplied with energy, or without such a view (e.g., based on stored position data).

Process 1400 may further include an operation 1406 of determining an energy supply angle. In accordance with above embodiments, this angle may be used to perform various movements. For example, if the gas tank input of a vehicle is angled downward, the energy supply angle of operation 1406 may match that angle, so as to properly input an energy nozzle into the input. This angle data may be developed from the machine learning or artificial intelligence techniques discussed above, or from other stored data indicating such angle. In further embodiments, the angle of retreat may also be determined in operation 1406. Such angle may be, for example, the same as or the inverse of the energy approach angle. Various other angles of approach or retreat may be determined too in operation 1406, such as angled needed to grasp an energy supply mechanism (e.g., fueling handle or charging cord), open a lid, press a button, pierce or cut a material, rotate an object, pick up or move an object, and the like.

Process 1400 may further include an operation 1407 of enabling supply of energy via the energy supply mechanism to the machine using the energy input. For example, this may involve grasping an energy supply mechanism (e.g., gas fueling handle, charging cord, or the like). Further, in some embodiments this may involve moving the energy supply mechanism into a position to provide energy (e.g., as determined in operation 1404 or 1405). In further embodiments, operation 1407 may include commencing a beginning of energy supply. For example, this may involve pressing a trigger, pressing a button, flipping a switch, or the like. In some embodiments, this may involve sending a signal (wired or wireless) to commence energy delivery. For example, the gripper device may send such a signal via its communications interface, as discussed above.

Process 1400 may further include an operation 1408 of determining whether an energy supply completion state is reached. This may include sensing via a sensor (e.g., fuel level sensor) that fueling is complete. Further, this may involve communicating with the device receiving power (wired or wireless) that a determined or requested energy level has been reached. In some embodiments, operation 1408 may also determine if an error situation is detected. For example, a fueling sensor may detect an overflow of fueling liquid, a sensor may detect an overheat condition, a sensor may detect an unplugged or disengaged fueling connector condition, a sensor may determine an usually high volume or rapidity of fueling, a sensor may determine a spike or drop in energy (e.g., voltage or current) being supplied, or the like.

If operation 1408 results in a completion state, or an error state, energy supply may be concluded, paused, or the like in operation 1410. For example, energy supply completion may result in energy supply being concluded, and robotic mechanism may return an energy supply device (e.g., nozzle, cable, etc.) to its original location.

Further, an energy supply lid, cap, or the like may be replaced (e.g., rotated, tightened, closed, etc.). Alternatively, if an error is detected in operation 14084, energy supply may either be concluded or paused (e.g., until it is determined that the error condition is resolved). If completion state 1408 is not reached, energy supply may continue in operation 1409. For example, operation 1408 may cycle or repeat periodically, continuously, or upon request, and may continue in operation 1409 until a completion state is reached.

Figure 15:
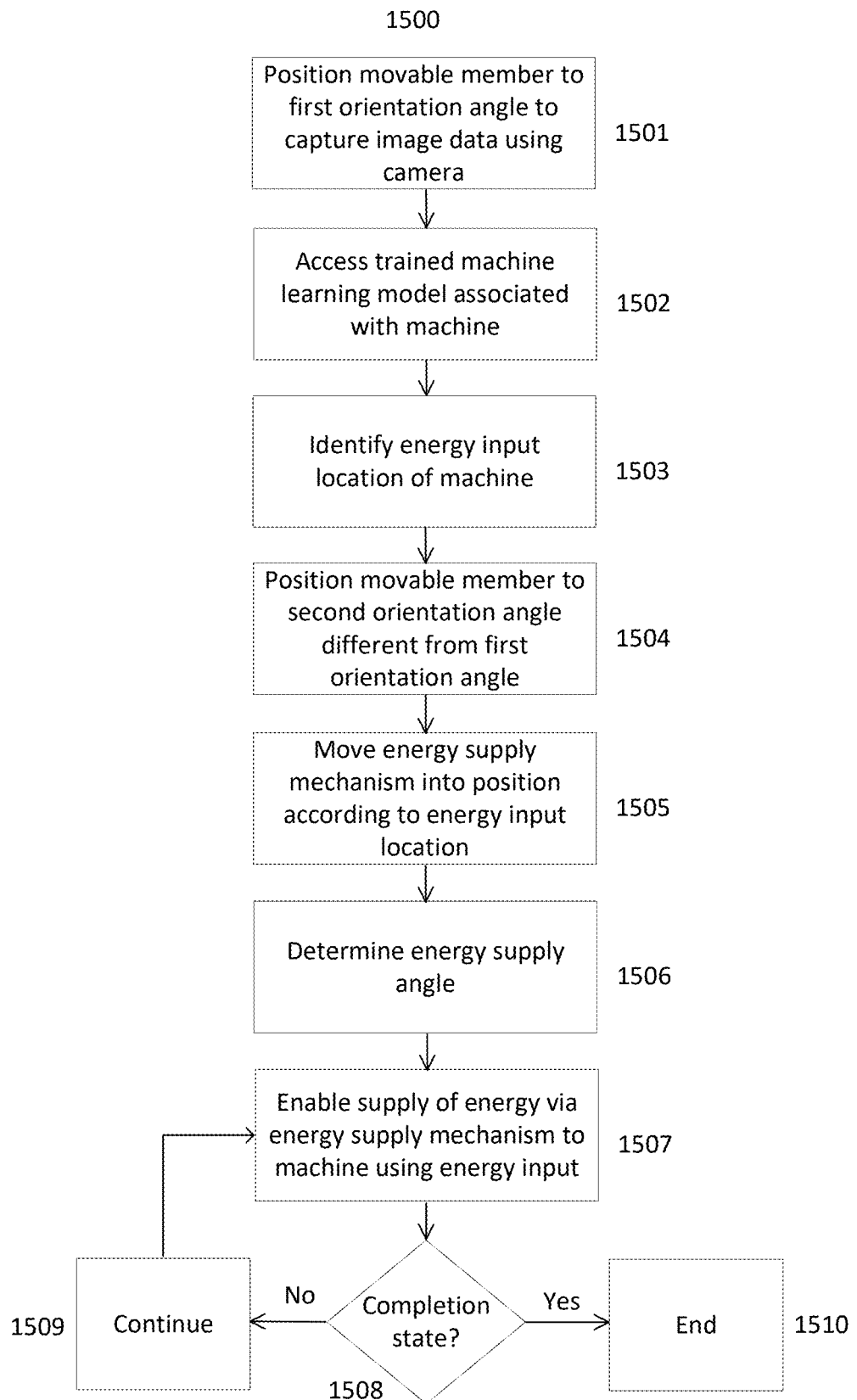
FIG. 15 illustrates an exemplary process for automatically enabling supply of energy to a machine using a movable member comprising a camera and an energy supply mechanism, in accordance with disclosed embodiments.

FIG. 15 illustrates an exemplary process 1500 for automatically enabling supply of energy to a machine using a movable member comprising a camera and an energy supply mechanism, in accordance with disclosed embodiments. In accordance with the above discussion, process 1500 may be implemented by various components in the system environments shown in FIGS. 1-7. For example, process 1500 may be implemented by a computing system within a robotic mechanism, as discussed above, or at a separate computing device, as also discussed above. In other embodiments, process 1500 may be carried out by a combination of two or more such computing systems. Consistent with the above discussion, the operations of process 1500 may be similar to those of process 1400.

In an operation 1501, process 1500 may include positioning the movable member to a first orientation angle to capture image data using a camera. For example, as discussed above, camera 109 or another camera may be moved into a position to capture image data of vehicle 112, lid 113, an energy supply receptacle, or the like.

The position of the camera may be determined based on stored position (e.g., coordinates) data. Further, the position of the camera may be determined based on machine vision techniques. For example, using the artificial intelligence or machine learning techniques discussed above, the camera may be used to classify or identify particular objects, such as vehicle 112, lid 113, an energy supply receptacle, or the like.

Based on such classifications or identification of objects, the system may determine that the camera is properly viewing a given object.

In an operation 1502, process 1500 may include accessing a trained machine learning model associated with the machine. As discussed above, the artificial intelligence or machine learning model may be trained to recognized various types of objects in the environments of FIGS. 1-7, such as vehicle 112, lid 113, an energy supply receptacle, or the like. In other embodiments, various other types of objects may be identified or classified as well, such as buttons, switches, levers, dials, wires, gears, windows, circuitry, handles, triggers, caps, covers, and the like.

In an operation 1503, process 1500 may include identifying, based on the trained machine learning model and the captured image data, an energy input location of the machine. Consistent with above embodiments, this location data may be stored (e.g., as coordinates, whether two-dimensional, three-dimensional, six-dimensional, or the like). The energy input location may be, for example, an opening, an interface, a nozzle, a cap, a lid, a cover, a button, or the like. In some embodiments, the energy input location is expressed as a center point, diameter, radius, circumference, or perimeter of the energy input.

In an operation 1504, process 1500 may include positioning the movable member to a second orientation angle different from the first orientation angle. In some embodiments, as discussed above, moving the robotic mechanism in this way may mean that camera 109 (or another camera) no longer has an active or continuous view of the energy input location. Nevertheless, in operation 1503 that location data may be determined and stored. Accordingly, the system need not have a consistent or present camera view of the energy input location to accomplish energy provision.

In an operation 1505, process 1500 may include moving the energy supply mechanism into a position according to the energy input location. As discussed above, this may be done using the stored position (e.g., coordinate) data for the energy input location. Using this position data, the robotic mechanism as discussed above may move (e.g., using one or more pivots, arms, or gripper devices) into a position to provide energy.

In an operation 1506, process 1500 may include determining an energy supply angle. This angle, as discussed above, may correspond to an angle of an energy receptacle of the energy input (e.g., an angle of an input, pipe, valve, connector, cable, etc.). In some embodiments, both an angle of approach and an angle of retreat are determined.

In an operation 1507, process 1500 may include enabling supply of energy via the energy supply mechanism to the machine at the energy input location.

As discussed above, in some embodiments this may include moving the robotic mechanism into a position to grasp, grip, or otherwise secure an energy provision device (e.g., grip, handle, cable, etc.). The position of the energy provision device may be stored (e.g., as coordinates) as discussed above. Alternatively, it may be determined using machine vision techniques and the classification or identification machine learning or artificial intelligence techniques discussed above. In some embodiments operation 1507 may also include moving a robotic mechanism into a position, as discussed above, to supply energy at the energy input location. This may be done by moving the robotic mechanism (e.g., via one or more pivot, arm, or gripper device) based on a determined path, position, or angle of approach or retreat. Energy may be supplied as discussed above in various ways, such as pressing a trigger, pressing a valve, pressing a button, connecting a cable, or various others.

In an operation 1508, process 1500 may include determining whether an energy supply completion state is reached. Similar to FIG. 14, an energy supply completion state may indicate that energy supply has reached a determined or sensed completion condition. Further, in some embodiments the completion state may indicate that an error (e.g., oversupply, overheat, etc.) has been detected. If the completion state is reached in operation 1508, process 1500 may conclude or pause in operation 1510. Alternatively, through regular, continuous, or on-demand cycling of operation 1508, if it is determined that a completion state is not reached, process 1500 may continue in operation 1509. This may involve continuing to supply energy to the device until a completion state is reached in operation 1508.

Figure 16:
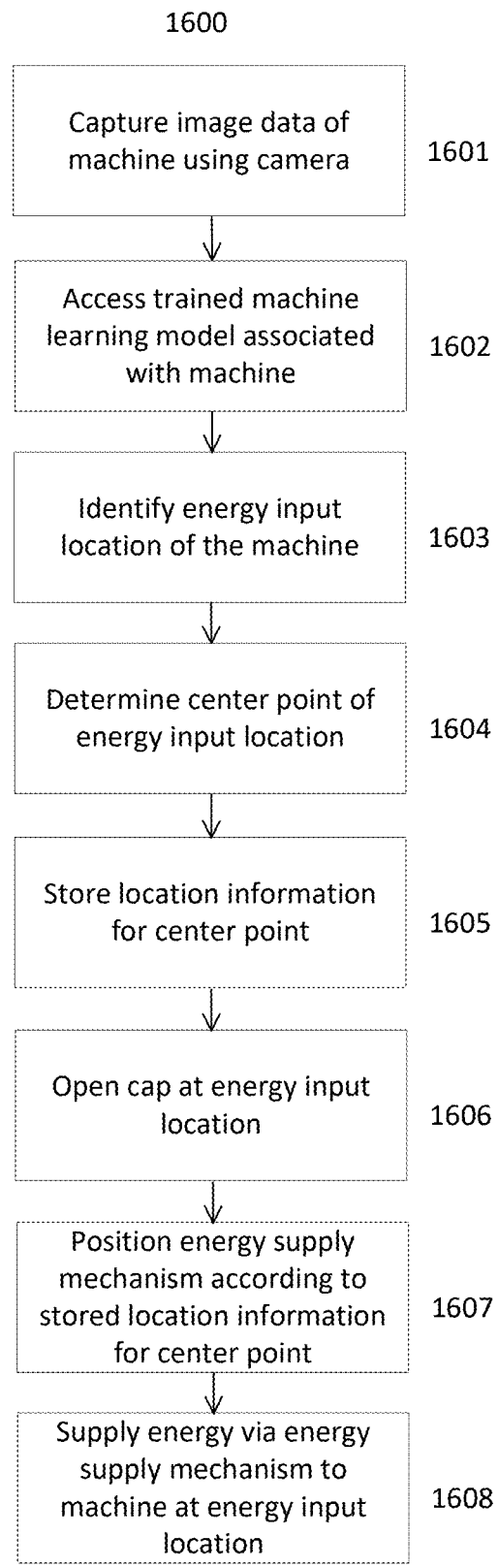
FIG. 16 illustrates an exemplary process for automatically enabling supply of energy to a machine using a movable member comprising a camera and an energy supply mechanism, in accordance with disclosed embodiments.

FIG. 16 illustrates an exemplary process 1600 for automatically enabling supply of energy to a machine using a movable member comprising a camera and an energy supply mechanism, in accordance with disclosed embodiments. In accordance with the above discussion, process 1600 may be implemented by various components in the system environments shown in FIGS. 1-7. For example, process 1600 may be implemented by a computing system within a robotic mechanism, as discussed above, or at a separate computing device, as also discussed above. In other embodiments, process 1600 may be carried out by a combination of two or more such computing systems.

As illustrated, process 1600 may include an operation 1601 of capturing image data of the machine using a camera. As discussed above in connection with FIGS. 1-7, for example, camera 109 or another camera may be used to capture image data. The image data may correspond to a device (e.g., (e.g., vehicle, robot, drone, appliance, equipment, machinery, etc.). Further, the image data may correspond to a specific object or part of a device, such as a lid, cap, nozzle, hole, opening, button, interface, connection, etc.

Process 1600 may also include an operation 1602 of accessing a trained machine learning model associated with the machine. The machine learning or artificial intelligence model may be trained, as discussed above, either in the actual environment implementing process 1600 (e.g., the system environments of FIGS. 1-7) or in a separate environment. Using either approach, the model may be trained to identify or classify various types of objects. In some embodiments, the machine learning or artificial intelligence model is stored and implemented locally within the environment shown in FIGS. 1-7. For example, the robotic mechanism or other system component may include computing components that store and implement the model. Alternatively, the model may be stored and/or run remotely from such system environments.

Process 1600 may further include an operation 1603 of identifying, based on the trained machine learning model and the captured image data, an energy input location of the machine. In accordance with above embodiments, the machine learning or artificial intelligence model may be configured to classify or identify various types of objects, such as a vehicle, robot, drone, appliance, equipment, machinery, as a whole, or a component such as a lid, cap, nozzle, hole, opening, button, interface, connection, etc.

Process 1600 may also include an operation 1604 of determining a center point of the energy input location. For example, this may include determining a center point of a hole, nozzle, interface, connector, intake, cap, lid, or the like. In other embodiments, operation 1604 may include determining a radius, diameter, circumference, or perimeter of the energy input location. This location information may then be stored in operation 1605.

Process 1600 may also include an operation 1606 of opening, using a robotic member, a cap at the energy input location. For example, as discussed above, cap engagement mechanism 809, as discussed above in connection with FIGS. 8A-8B, cap engagement mechanism 905, as discussed above in connection with FIGS. 9A-9B, cap engagement mechanism 1008, as discussed above in connection with FIG. 10, cap engagement mechanism 1103, as discussed above in connection with FIG. 11, cap engagement mechanism 1202, as discussed above in connection with FIG. 12, or the like, may be used to open the cap of the energy input location. This may include, in various embodiments, pressing the lid, pulling the lid, pressing the cap, pulling the cap, turning the cap, squeezing a lid or cap, etc.

Process 1600 may further include an operation 1607 of, without requiring any additional image data from the camera, positioning an energy supply mechanism according to the stored location information for the center point. For example, as discussed above in connection with FIGS. 1-7, camera 109 may be on a different surface or plane of a gripper device than the cap engagement mechanism and/or the nozzle engagement mechanism. In this situation, when the energy supply mechanism is positioned to supply energy to a device, the camera may be facing away from the device. Despite this, the system may provide energy in a "blind" state, as discussed above, using the stored position data for the energy supply device and/or the energy input location. For example, in operation 1605, the center point data for the energy input location is stored and may be used in operation 1607 to supply energy to a device in a proper location. Of course, in other embodiments, one or more camera may continuously or periodically view the energy input location during the course of providing energy.

Process 1600 may also include an operation 1608 of, without requiring any additional image data from the camera, supplying energy via the energy supply mechanism to the machine at the energy input location. Like operation 1607, operation 1608 may potentially be performed without a continuous or live camera view of the energy supply input location. The techniques for supplying energy are discussed above and include, among others, pressing a trigger, valve, nozzle, button, handle, grip, cable, or the like.

Figure 17:
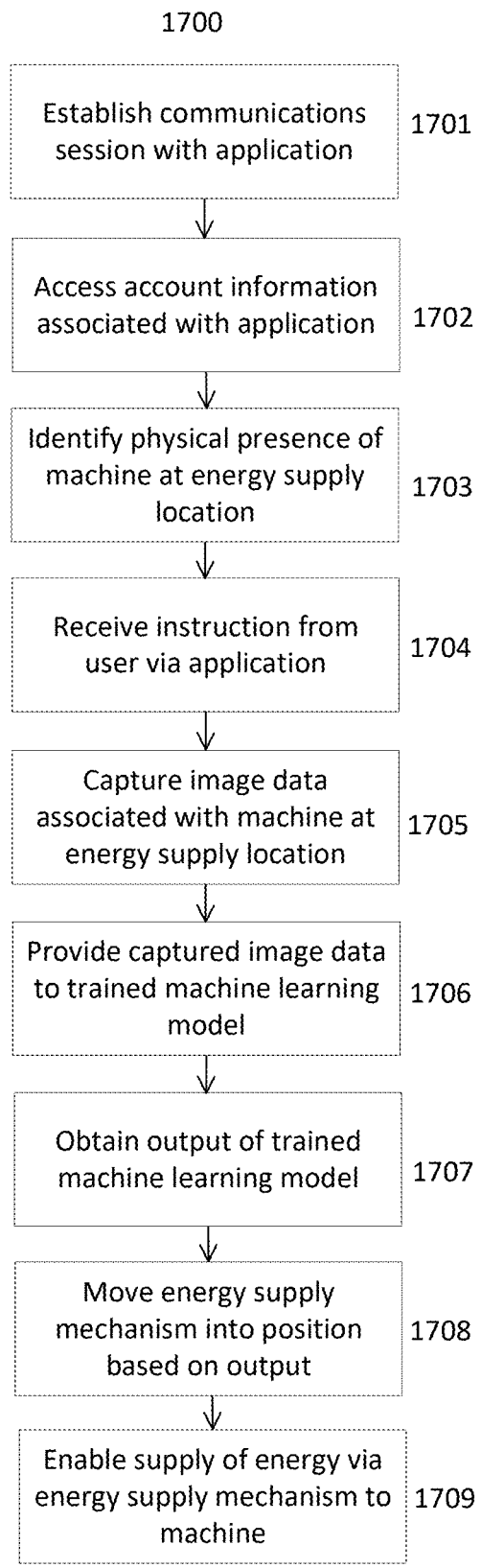
FIG. 17 illustrates an exemplary process for efficiently and automatically enabling supply of energy to a machine, in accordance with disclosed embodiments.

FIG. 17 illustrates an exemplary process 1700 for efficiently and automatically enabling supply of energy to a machine, in accordance with disclosed embodiments. In accordance with the above discussion, process 1700 may be implemented by various components in the system environments shown in FIGS. 1-7. For example, process 1700 may be implemented by a computing system within a robotic mechanism, as discussed above, or at a separate computing device, as also discussed above. In other embodiments, process 1700 may be carried out by a combination of two or more such computing systems.

As shown in FIG. 17, process 1700 may include an operation 1701 of establishing a communications session with an application associated with a user. For example, as discussed above in connection with FIGS. 1-7, the robotic mechanism or another component in the system environment may include a communications interface (wired or wireless). The communications interface may be configured for several types of communications, such as via a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In such embodiments, the communication session may exist between the robotic mechanism (or another system component) and various types of applications associated with a user. For example, the user (e.g., driver) may use a mobile application for the session. Alternatively, the device (e.g., vehicle) itself may run an application that is used in the session.

Consistent with above embodiments, the application associated with the user may store various types of data useful for receiving energy. This may include, for example, personal identification data (e.g., name, address, driver's license, etc.), vehicle identification data (e.g., VIN number, license plate number, serial number, etc.), payment data (e.g., bank account, credit card, etc.), energy supply data (e.g., a desired or preset energy receiving threshold (e.g., limit, percentage, etc.), a desired or preset type of energy (e.g., type of fuel, octane, etc.), a desired or present energy receiving duration (e.g., in minutes, seconds, etc.), or the like.

Further, process 1700 may include an operation 1702 of accessing account information associated with the application, wherein the account information identifies the machine. In some embodiments, the account information (e.g., the various types of data discussed above in connection with operation 1701) may reside on the user's device, while in other embodiments it may be stored remotely (e.g., at a server). As an illustrative example, the accessed account information may identify a type of the user's vehicle (e.g., a particular electric vehicle model), a type of energy to be supplied (e.g., electricity), and a threshold for the energy supply (e.g., 80% of full charging capacity). As another example, the accessed account information may identify a type of the user's vehicle (e.g., a particular internal combustion vehicle model), a type of energy to be supplied (e.g., 91 octane), and a dollar limit for fueling (e.g., $50). Various other examples are possible as well, based on the data discussed above.

Further, process 1700 may include an operation 1703 of identifying a physical presence of the machine at an energy supply location. Consistent with above embodiments, this may be accomplished in several ways, such as using camera 109 or another camera. The presence of the machine may be determined in other ways too, such as via a signal from the user's vehicle, an application running in the vehicle, a user's application (e.g., mobile app), etc.

Either before or after operation 1703, the robotic mechanism may take one or more actions to prepare for an energy supply session for a device. For example, in embodiments where a vehicle is receiving fuel or electricity, the robotic mechanism may move into a position where the vehicle will be parked during energy delivery. In some embodiments, such a position (e.g., parking spot, or the like) may be reserved for the vehicle. Additional preparation actions may include, for example, selecting one or more advertisement to display to the user (e.g., via a screen, or audibly via a loudspeaker, etc.), selecting entertainment content to display to the user, selecting a fuel type, grasping an energy supply mechanism, etc.

Further, process 1700 may include an operation 1704 of receiving an instruction from the user via the application. In some embodiments, the instruction may be to begin providing energy. In further embodiments, the instruction may specify a type of energy to be supplied, a duration of energy supply, a cost of energy supply, a threshold or limit of energy supply, or various others.

Further, process 1700 may include an operation 1705 of capturing via a camera image data associated with the machine at the energy supply location. As discussed above, this may include utilizing a camera, such as camera 109 or another, to obtain image data associated with the machine. This may include, for example, an image of a vehicle, cap, lid, nozzle, film, plug, opening, hole, button, conduit, interface, connector, etc.

Further, process 1700 may include an operation 1706 of providing the captured image data to a trained machine learning model. Consistent with the above, the model may be trained based on the unique environment (e.g., of FIGS. 1-7) or another testing environment.

Further, process 1700 may include an operation 1707 of obtaining an output of the trained machine learning model. The output may be, for example, a classification or identification of a particular object. For example, operation 1707 may identify or classify a particular device, such as a vehicle or otherwise. Further, operation 1707 may identify or classify a portion or object of a device, such as a cap, lid, nozzle, opening, interface, conduit, hold, connection, etc.

Further, process 1700 may include an operation 1708 of moving an energy supply mechanism into a position based on the output. Consistent with the embodiments discussed above, this may include moving the robotic mechanism using one or more of its pivots, arms, and/or gripper devices. Further, in some embodiments the robotic mechanism may move on a track, via wheels, via suction cups, via treads, etc.

Further, process 1700 may include an operation 1709 of enabling supply, based on the instruction from the user, of energy via the energy supply mechanism to the machine. The instruction from the user may be, for example, a command to begin energy supply, a consent or agreement to begin energy supply, a duration of energy supply, a cost of energy supply, a rate of energy supply, a volume of energy supply, etc. In accordance with the above disclosure, this may include one or more of pressing, grasping, squeezing, rotating, or the like, with respect to an energy supply mechanism. Energy may then be supplied to the device as discussed above in various embodiments.

In some embodiments, the user may have an option in their application to pause or end energy supply from the robotic device. For example, if the user wishes to pause or end energy supply, they may select a corresponding command in their application, which may then transmit a message to the robotic mechanism to pause or end energy supply.

Figure 18:
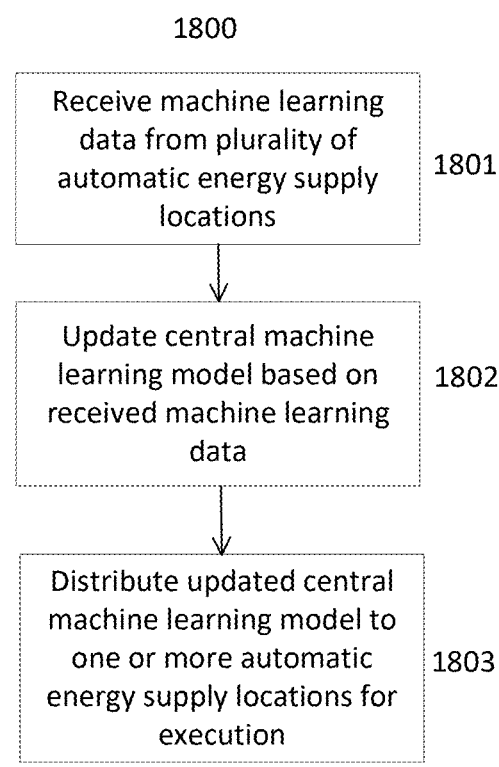
FIG. 18 illustrates an exemplary process for interactively enabling supply of energy to a machine associated with a user, in accordance with disclosed embodiments.

FIG. 18 illustrates an exemplary process 1800 for interactively enabling supply of energy to a machine associated with a user, in accordance with disclosed embodiments. In accordance with the above discussion, process 1800 may be implemented by various components in the system environments shown in FIGS. 1-7. For example, process 1800 may be implemented by a computing system within a robotic mechanism, as discussed above, or at a separate computing device, as also discussed above. In other embodiments, process 1800 may be carried out by a combination of two or more such computing systems.

As discussed above, process 1800 may include an operation 1801 of receiving, from a plurality of automatic energy supply locations, machine learning data. The energy supply locations may be places where energy is supplied to devices, such as fueling or charging stations, or the like. In some embodiments, each of the automatic energy supply locations may execute a machine learning model to identify locations on machines for supplying energy. For example, as discussed above, the machine learning models may be trained to classify or identify objects such as vehicles, caps, lids, openings, receptacles, films, nozzles, holes, plugs, connectors, interfaces, etc. Further, in some embodiments the received machine learning data may comprise at least one of vehicle type, energy supply location data, or energy supply image data. Various other types of captured data from the environment (e.g., the environments of FIGS. 1-7) may be received as well. In some embodiments, the captured data includes multiple images of the same object. For example, multiple images may be captured from varying angles, in varying lighting conditions, in varying temperatures, in varying humidity conditions, and the like. By capturing multiple images of the same object from various perspectives in this manner, the robustness of the machine learning or artificial intelligence model may be enhanced through training, in operation 1802.

Process 1800 may further include an operation 1802 of updating a central machine learning model based on the received machine learning data. As discussed above, machine learning or artificial intelligence models may be continuously or periodically updated and trained to improve their performance. By updating the model with data from operation 1801 (e.g., new images of objects, new data regarding the environments, etc.), the classification or identification capabilities of the model may be improved.

In addition, process 1800 may include an operation 1803 of distributing the updated central machine learning model to one or more of the plurality of automatic energy supply locations for execution. That is, once the model is updated centrally (e.g., at a server), it may be distributed over a network connection to one or more of the energy supply locations. The energy supply locations may then store and implement the model locally (e.g., stored in the robotic mechanism as discussed above, or in a separate computing device). Alternatively, the model may be stored at the remote server and implemented there, and its outputs and instructions may be transmitted to individual energy supply locations.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant imaging techniques, machine learning or artificial intelligence techniques, robotic techniques, and programming techniques will be developed, and the scope of this disclosure is intended to include all such new technologies a priori.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A computer-implemented method for automatically enabling supply of energy to a machine using a movable member comprising a camera and an energy supply mechanism, comprising:
    positioning the movable member to a first orientation angle to capture image data using the camera;
    accessing a trained machine learning model associated with the machine;
    identifying, based on the trained machine learning model and the captured image data, an energy input location of the machine, wherein the trained machine learning model is configured to segment types of objects represented in the captured image data, and wherein identifying the energy input location includes determining:
        a position of the energy input location relative to three perpendicular axes, and
        an orientation of the energy input location relative to each of the three perpendicular axes;
    based on the determined position and orientation of the energy input location, positioning the movable member to a second orientation angle different from the first orientation angle;
    moving the energy supply mechanism into a position according to the energy input location, wherein the positioning of the movable member to the second orientation angle and moving the energy supply mechanism into the position are based on the image data captured by the camera while the movable member is positioned in the first orientation angle without requiring additional image data captured by the camera after the movable member is moved from the first orientation angle; and
    enabling supply of energy via the energy supply mechanism to the machine at the energy input location.

2. The computer-implemented method of claim 1, wherein the movable member comprises a robotic arm.

3. The computer-implemented method of claim 1, wherein the movable member comprises a mobile robotic device system.

4. The computer-implemented method of claim 1, wherein in the first orientation angle the energy supply mechanism does not obstruct a field of view of the camera.

5. The computer-implemented method of claim 1, wherein the camera and the energy supply mechanism are positioned on surfaces of the movable member that differ by ninety degrees.

6. The computer-implemented method of claim 1, wherein the camera and the energy supply mechanism are positioned on surfaces of the movable member that differ by one-hundred and eighty degrees.

7. The computer-implemented method of claim 1, wherein the supplying energy via the energy supply mechanism to the machine is based on the image data captured by the camera while the movable member is positioned in the first orientation angle without requiring additional image data captured by the camera after the movable member is moved from the first orientation angle.

8. A non-transitory computer-readable medium storing instructions executable by at least one hardware processor to perform operations for automatically enabling supply of energy to a machine using a movable member comprising a camera and an energy supply mechanism, the operations comprising:
    positioning the movable member to a first orientation angle to capture image data using the camera;
    accessing a trained machine learning model associated with the machine;
    identifying, based on the trained machine learning model and the captured image data, an energy input location of the machine, wherein the trained machine learning model is configured to segment types of objects represented in the captured image data, and wherein identifying the energy input location includes determining:
        a position of the energy input location relative to three perpendicular axes, and
        an orientation of the energy input location relative to each of the three perpendicular axes;
    based on the determined position and orientation of the energy input location, positioning the movable member to a second orientation angle different from the first orientation angle;

moving the energy supply mechanism into a position according to the energy input location, wherein the positioning of the movable member to the second orientation angle and moving the energy supply mechanism into the position are based on the image data captured by the camera while the movable member is positioned in the first orientation angle without requiring additional image data captured by the camera after the movable member is moved from the first orientation angle; and enabling supply of energy via the energy supply mechanism to the machine at the energy input location.

9. The non-transitory computer-readable medium of claim 8, wherein the camera is laser-based.

10. The non-transitory computer-readable medium of claim 8, wherein the camera is time-of-flight based.

11. The non-transitory computer-readable medium of claim 8, wherein the camera captures three-dimensional image data.

12. The non-transitory computer-readable medium of claim 11, wherein the three-dimensional image data includes a point cloud.

13. The non-transitory computer-readable medium of claim 8, wherein the energy supply mechanism is pneumatically operated.

14. The non-transitory computer-readable medium of claim 8, wherein the energy supply mechanism is magnetically operated.

15. The non-transitory computer-readable medium of claim 8, wherein the energy supply mechanism is electrically operated.

16. The non-transitory computer-readable medium of claim 8, wherein enabling the supply of energy comprises manipulating a component of the energy supply mechanism.

17. The non-transitory computer-readable medium of claim 8, wherein enabling the supply of energy comprises controlling a start and a stop of the supply of energy via the energy supply mechanism to the machine at the energy input location.

* * * * *